US011243996B2

(12) United States Patent
Huyghe et al.

(10) Patent No.: US 11,243,996 B2
(45) Date of Patent: Feb. 8, 2022

(54) DIGITAL ASSET SEARCH USER INTERFACE

(71) Applicant: Apple Inc., Cupertino, CA (US)

(72) Inventors: Killian Huyghe, San Francisco, CA (US); Lee A. Morgan, San Jose, CA (US); Elliot C. Liskin, San Jose, CA (US); Guillaume Vergnaud, Tokyo (JP); Eric Circlaeys, Los Gatos, CA (US); Michael S. Smochko, San Jose, CA (US); Joy Hsu, Cypress, CA (US); Sabrine Rekik, San Francisco, CA (US); Kevin Aujoulet, San Francisco, CA (US); Benedikt M. Hirmer, San Francisco, CA (US); Kevin Bessiere, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 454 days.

(21) Appl. No.: 16/147,067

(22) Filed: Sep. 28, 2018

(65) Prior Publication Data

US 2019/0340252 A1    Nov. 7, 2019

Related U.S. Application Data

(60) Provisional application No. 62/668,181, filed on May 7, 2018.

(51) Int. Cl.
*G06F 3/0481*    (2013.01)
*G06F 16/438*    (2019.01)
(Continued)

(52) U.S. Cl.
CPC ........ *G06F 16/438* (2019.01); *G06F 3/04817* (2013.01); *G06F 16/48* (2019.01); *G06F 16/90328* (2019.01)

(58) Field of Classification Search
CPC .... G06F 16/338; G06F 16/383; G06F 16/438; G06F 16/48; G06F 16/532; G06F 16/90328; G06F 3/04817; G06F 3/04842
See application file for complete search history.

(56) References Cited

U.S. PATENT DOCUMENTS

| 5,416,895 | A | 5/1995 | Anderson et al. |
| 5,565,888 | A | 10/1996 | Selker |

(Continued)

FOREIGN PATENT DOCUMENTS

| CN | 1717918 A | 1/2006 |
| CN | 1756273 A | 4/2006 |

(Continued)

OTHER PUBLICATIONS

US 2002/0018582 A1, 02/2002, Yasuji (withdrawn)
(Continued)

*Primary Examiner* — Mark D Featherstone
*Assistant Examiner* — Navneet Gmahl
(74) *Attorney, Agent, or Firm* — Blank Rome LLP

(57) ABSTRACT

Embodiments of the present disclosure present devices, methods, and computer readable medium for presenting a user interface that allows a user to quickly and easily filter and search a digital asset collection. The disclosed techniques allow for rapid recall of desired digital assets, linking assets into logical collections, and an overall improved user experience. The zero keyword/contextual keyword feature presents multimedia content icons and searchable keywords to allow a user to search the digital asset collection simply by tapping on one of these keywords. The top auto completion feature auto-completes suggestions in the search field based on various heuristics to ensure the method produces diverse and relevant results. The next keyword suggestion (Continued)

feature predicts a next search term based on learned properties about the digital asset collection.

20 Claims, 15 Drawing Sheets

(51) Int. Cl.
*G06F 16/48* (2019.01)
*G06F 16/9032* (2019.01)

(56) References Cited

U.S. PATENT DOCUMENTS

| | | | |
|---|---|---|---|
| 5,604,861 A | 2/1997 | Douglas et al. | |
| 5,677,708 A | 10/1997 | Matthews, III et al. | |
| 5,757,368 A | 5/1998 | Gerpheide et al. | |
| 5,784,061 A | 7/1998 | Moran et al. | |
| 5,825,349 A | 10/1998 | Meier et al. | |
| 5,956,035 A | 9/1999 | Sciammarella et al. | |
| 5,973,694 A | 10/1999 | Steele et al. | |
| 6,073,036 A | 6/2000 | Heikkinen et al. | |
| 6,237,010 B1 | 5/2001 | Hui et al. | |
| 6,252,596 B1 | 6/2001 | Garland | |
| 6,279,018 B1 | 8/2001 | Kudrolli et al. | |
| 6,301,586 B1 | 10/2001 | Yang et al. | |
| 6,334,025 B1 | 12/2001 | Yamagami | |
| 6,351,556 B1 | 2/2002 | Loui et al. | |
| 6,441,824 B2 | 8/2002 | Hertzfeld | |
| 6,452,597 B1 | 9/2002 | Goldberg et al. | |
| 6,477,117 B1 | 11/2002 | Narayanaswami et al. | |
| 6,606,411 B1 | 8/2003 | Loui et al. | |
| 6,686,938 B1 | 2/2004 | Jobs et al. | |
| 6,741,268 B1 | 5/2004 | Hayakawa | |
| 6,784,925 B1 | 8/2004 | Tomat et al. | |
| 6,915,011 B2 | 7/2005 | Loui et al. | |
| 6,920,619 B1 | 7/2005 | Milekic | |
| 7,015,910 B2 | 3/2006 | Card et al. | |
| 7,139,982 B2 | 11/2006 | Card et al. | |
| 7,164,410 B2 | 1/2007 | Kupa | |
| 7,178,111 B2 | 2/2007 | Glein et al. | |
| 7,325,198 B2 | 1/2008 | Adcock et al. | |
| 7,421,449 B2 | 9/2008 | Williams et al. | |
| 7,434,177 B1 | 10/2008 | Ording et al. | |
| 7,587,671 B2 | 9/2009 | Saft et al. | |
| 7,627,828 B1 | 12/2009 | Collision et al. | |
| 7,636,733 B1 | 12/2009 | Rothmuller | |
| 7,680,340 B2 | 3/2010 | Lou et al. | |
| 7,716,194 B2 | 5/2010 | Williams et al. | |
| 7,747,625 B2 | 6/2010 | Gargi et al. | |
| 7,788,592 B2 | 8/2010 | Williams et al. | |
| 7,823,080 B2 | 10/2010 | Miyajima et al. | |
| 7,831,100 B2 | 11/2010 | Gallagher | |
| 7,843,454 B1 * | 11/2010 | Biswas | G06T 13/00 |
| | | | 345/473 |
| 7,865,215 B2 | 1/2011 | Bells et al. | |
| 7,991,234 B2 | 8/2011 | Hamasaki et al. | |
| 8,024,658 B1 | 9/2011 | Fagans et al. | |
| 8,028,249 B2 | 9/2011 | Loui et al. | |
| 8,106,856 B2 | 1/2012 | Matas et al. | |
| RE43,260 E | 3/2012 | Paalasmaa et al. | |
| 8,200,669 B1 * | 6/2012 | Iampietro | G06F 16/783 |
| | | | 707/737 |
| 8,305,355 B2 | 11/2012 | Matas et al. | |
| 8,339,420 B2 | 12/2012 | Kenji | |
| 8,352,471 B2 | 1/2013 | Ryoma | |
| 8,406,473 B2 | 3/2013 | Tanaka | |
| 8,571,331 B2 * | 10/2013 | Cifarelli | G06K 9/6226 |
| | | | 382/224 |
| 8,698,762 B2 | 4/2014 | Wagner et al. | |
| 9,026,909 B2 | 5/2015 | Pendergast et al. | |
| 9,042,646 B2 | 5/2015 | Das et al. | |
| 9,123,086 B1 | 9/2015 | Freeland et al. | |
| 9,143,601 B2 | 9/2015 | Padmanabbban et al. | |
| 9,411,506 B1 | 8/2016 | Prado et al. | |
| 9,529,867 B1 * | 12/2016 | Blevins | G06F 16/9537 |
| 9,712,482 B2 * | 7/2017 | Aravamudan | H04L 51/32 |
| 9,792,530 B1 * | 10/2017 | Wu | G06K 9/6262 |
| 10,467,290 B1 * | 11/2019 | Wu | G06N 5/022 |
| 10,803,135 B2 * | 10/2020 | Hirmer | G06F 16/9537 |
| 2002/0021758 A1 | 2/2002 | Chui | |
| 2002/0054233 A1 | 5/2002 | Masahiro | |
| 2002/0093531 A1 | 7/2002 | Barile | |
| 2002/0107973 A1 * | 8/2002 | Lennon | G06F 16/9577 |
| | | | 709/231 |
| 2002/0168108 A1 | 11/2002 | Loui | |
| 2003/0033296 A1 | 2/2003 | Rothmuller et al. | |
| 2003/0048291 A1 | 3/2003 | Dieberger | |
| 2003/0090504 A1 | 5/2003 | Brook | |
| 2003/0122787 A1 | 7/2003 | Zimmerman | |
| 2004/0046886 A1 | 3/2004 | Ambiru | |
| 2004/0119758 A1 | 6/2004 | Grossman | |
| 2004/0125150 A1 | 7/2004 | Adcock et al. | |
| 2004/0143590 A1 * | 7/2004 | Wong | G06F 16/907 |
| 2004/0167898 A1 | 8/2004 | Margolus | |
| 2004/0177319 A1 * | 9/2004 | Horn | G06F 16/26 |
| | | | 715/205 |
| 2004/0205504 A1 | 10/2004 | Phillips | |
| 2004/0207722 A1 | 10/2004 | Koyama | |
| 2004/0212617 A1 | 10/2004 | Fitzmaurice | |
| 2005/0020317 A1 | 1/2005 | Koyama | |
| 2005/0041035 A1 | 2/2005 | Nagatomo | |
| 2005/0044066 A1 | 2/2005 | Hooper et al. | |
| 2005/0052427 A1 | 3/2005 | Wu | |
| 2005/0062130 A1 | 3/2005 | Ciancio | |
| 2005/0071736 A1 | 3/2005 | Schneider | |
| 2005/0071767 A1 | 3/2005 | Kirkland | |
| 2005/0073601 A1 | 4/2005 | Battles | |
| 2005/0076056 A1 | 4/2005 | Paalasmaa | |
| 2005/0102635 A1 | 5/2005 | Jiang | |
| 2005/0104848 A1 | 5/2005 | Yamaguchi | |
| 2005/0128305 A1 | 6/2005 | Hamsaki et al. | |
| 2005/0134945 A1 | 6/2005 | Gallagher | |
| 2005/0160377 A1 | 7/2005 | Sciammarella | |
| 2005/0183026 A1 | 8/2005 | Ryoko | |
| 2005/0195221 A1 | 9/2005 | Berger | |
| 2005/0275636 A1 | 12/2005 | Dehlin | |
| 2006/0001652 A1 | 1/2006 | Chiu | |
| 2006/0017692 A1 | 1/2006 | Wehrenberg et al. | |
| 2006/0025218 A1 | 2/2006 | Hotta | |
| 2006/0026521 A1 | 2/2006 | Hotelling et al. | |
| 2006/0026536 A1 | 2/2006 | Hotelling et al. | |
| 2006/0036960 A1 * | 2/2006 | Loui | G06F 16/54 |
| | | | 715/764 |
| 2006/0072028 A1 | 4/2006 | Hong | |
| 2006/0077266 A1 | 4/2006 | Numi | |
| 2006/0080386 A1 | 4/2006 | Roykkee | |
| 2006/0088228 A1 | 4/2006 | Marriott et al. | |
| 2006/0090141 A1 | 4/2006 | Loui et al. | |
| 2006/0136839 A1 | 6/2006 | Makela | |
| 2006/0155757 A1 | 7/2006 | Williams et al. | |
| 2006/0156237 A1 | 7/2006 | Williams et al. | |
| 2006/0156245 A1 | 7/2006 | Williams et al. | |
| 2006/0156246 A1 | 7/2006 | Williams et al. | |
| 2006/0265643 A1 | 11/2006 | Saft et al. | |
| 2007/0008321 A1 * | 1/2007 | Gallagher | G06F 16/2477 |
| | | | 345/473 |
| 2007/0016868 A1 | 1/2007 | Nurmi | |
| 2007/0081740 A1 | 4/2007 | Ciudad et al. | |
| 2007/0115373 A1 * | 5/2007 | Gallagher | G06F 16/58 |
| | | | 348/231.3 |
| 2007/0136778 A1 | 6/2007 | Birger | |
| 2007/0152984 A1 | 7/2007 | Ording | |
| 2007/0204225 A1 | 8/2007 | Berkowitz | |
| 2007/0229678 A1 | 10/2007 | Barrus | |
| 2007/0245236 A1 | 10/2007 | Lee | |
| 2008/0030456 A1 | 2/2008 | Asadi | |
| 2008/0057941 A1 | 3/2008 | Scott et al. | |
| 2008/0059888 A1 | 3/2008 | Dunko | |
| 2008/0062141 A1 | 3/2008 | Chandhri | |
| 2008/0091637 A1 * | 4/2008 | Escamilla | G06F 16/951 |
| 2008/0109482 A1 * | 5/2008 | Macchletti | G06F 16/48 |
| 2008/0133697 A1 | 6/2008 | Stewart | |
| 2008/0152201 A1 | 6/2008 | Zhang et al. | |
| 2008/0168349 A1 | 7/2008 | Lamiraux et al. | |

(56) References Cited

U.S. PATENT DOCUMENTS

| | | | |
|---|---|---|---|
| 2008/0168402 A1 | 7/2008 | Blumenberg | |
| 2008/0256577 A1 | 10/2008 | Funaki et al. | |
| 2008/0263103 A1* | 10/2008 | McGregor | G06F 16/24 |
| 2008/0263471 A1* | 10/2008 | Hooper | G06F 16/58 |
| | | | 715/772 |
| 2008/0282202 A1 | 11/2008 | Sunday | |
| 2008/0301128 A1 | 12/2008 | Gandert et al. | |
| 2008/0309632 A1 | 12/2008 | Westerman et al. | |
| 2009/0006965 A1 | 1/2009 | Bodin et al. | |
| 2009/0021576 A1 | 1/2009 | Linder et al. | |
| 2009/0063542 A1 | 3/2009 | Bull et al. | |
| 2009/0113350 A1* | 4/2009 | Hibino | G06F 16/41 |
| | | | 715/853 |
| 2009/0132921 A1 | 5/2009 | Hwangbo et al. | |
| 2009/0161962 A1* | 6/2009 | Gallagher | G06K 9/6211 |
| | | | 382/203 |
| 2009/0210793 A1 | 8/2009 | Yee et al. | |
| 2009/0216806 A1 | 8/2009 | Feuerstein et al. | |
| 2009/0278806 A1 | 11/2009 | Duarte et al. | |
| 2009/0282371 A1 | 11/2009 | Curl | |
| 2009/0287470 A1 | 11/2009 | Farnsworth et al. | |
| 2009/0300146 A1 | 12/2009 | Park et al. | |
| 2009/0307623 A1 | 12/2009 | Agarawala et al. | |
| 2009/0319472 A1* | 12/2009 | Jain | G11B 27/105 |
| 2009/0325701 A1 | 12/2009 | Andres Del Valle | |
| 2010/0045828 A1 | 2/2010 | Gallagher | |
| 2010/0076976 A1 | 3/2010 | Sotirov et al. | |
| 2010/0083173 A1 | 4/2010 | Germann et al. | |
| 2010/0103321 A1 | 4/2010 | Ishikawa et al. | |
| 2010/0110228 A1 | 5/2010 | Ozawa et al. | |
| 2010/0114891 A1 | 5/2010 | Oami | |
| 2010/0125786 A1 | 5/2010 | Ozawa et al. | |
| 2010/0150456 A1 | 6/2010 | Tanaka | |
| 2010/0207892 A1 | 8/2010 | Lin et al. | |
| 2010/0287053 A1 | 11/2010 | Ganong et al. | |
| 2010/0302179 A1 | 12/2010 | Ahn et al. | |
| 2011/0025719 A1 | 2/2011 | Yanase | |
| 2011/0035700 A1 | 2/2011 | Meaney et al. | |
| 2011/0040776 A1* | 2/2011 | Najm | G06F 16/3326 |
| | | | 707/766 |
| 2011/0050564 A1 | 3/2011 | Alberth et al. | |
| 2011/0050640 A1 | 3/2011 | Lundback et al. | |
| 2011/0087670 A1* | 4/2011 | Jorstad | G06F 40/284 |
| | | | 707/741 |
| 2011/0099199 A1 | 4/2011 | Stalenhoef et al. | |
| 2011/0099478 A1 | 4/2011 | Gallagher et al. | |
| 2011/0126148 A1 | 5/2011 | Krishnaraj et al. | |
| 2011/0145275 A1 | 6/2011 | Stewart | |
| 2011/0145327 A1* | 6/2011 | Stewart | G06F 16/58 |
| | | | 709/203 |
| 2011/0191661 A1 | 8/2011 | Phillips et al. | |
| 2011/0246463 A1 | 10/2011 | Carson, Jr. et al. | |
| 2011/0267368 A1 | 11/2011 | Casillas et al. | |
| 2011/0282867 A1 | 11/2011 | Palermiti, II et al. | |
| 2011/0307425 A1* | 12/2011 | Wang | G06F 16/583 |
| | | | 706/12 |
| 2011/0320938 A1 | 12/2011 | Schorsch | |
| 2012/0110438 A1 | 5/2012 | Peraza et al. | |
| 2012/0243735 A1 | 9/2012 | Wu | |
| 2013/0022282 A1 | 1/2013 | Cooper | |
| 2013/0040660 A1 | 2/2013 | Fisher et al. | |
| 2013/0061175 A1 | 3/2013 | Matas et al. | |
| 2013/0156275 A1 | 6/2013 | Amacker et al. | |
| 2013/0198176 A1 | 8/2013 | Kim | |
| 2014/0046914 A1* | 2/2014 | Das | G06F 16/58 |
| | | | 707/694 |
| 2014/0055495 A1 | 2/2014 | Kim et al. | |
| 2014/0064572 A1 | 3/2014 | Panzer et al. | |
| 2014/0082533 A1 | 3/2014 | Fukuda | |
| 2014/0089330 A1 | 3/2014 | Cui et al. | |
| 2014/0143693 A1 | 5/2014 | Goossens et al. | |
| 2014/0157321 A1 | 6/2014 | Kurita | |
| 2014/0181089 A1* | 6/2014 | Desmond | G06F 16/5866 |
| | | | 707/722 |
| 2014/0189584 A1 | 7/2014 | Weng et al. | |
| 2014/0195532 A1* | 7/2014 | Dheap | G06F 16/901 |
| | | | 707/736 |
| 2014/0198234 A1 | 7/2014 | Kobayashi et al. | |
| 2014/0218371 A1 | 8/2014 | Du et al. | |
| 2014/0222809 A1* | 8/2014 | Hochmuth | G06F 16/29 |
| | | | 707/736 |
| 2014/0236882 A1 | 8/2014 | Rishe | |
| 2014/0250126 A1 | 9/2014 | Baldwin et al. | |
| 2014/0250374 A1 | 9/2014 | Ohki et al. | |
| 2014/0282011 A1 | 9/2014 | Dellinger et al. | |
| 2014/0289222 A1 | 9/2014 | Sharpe et al. | |
| 2014/0337324 A1 | 11/2014 | Chao et al. | |
| 2014/0341476 A1 | 11/2014 | Kulick et al. | |
| 2014/0351720 A1 | 11/2014 | Yin | |
| 2015/0005013 A1 | 1/2015 | Cao et al. | |
| 2015/0078680 A1 | 3/2015 | Shakib et al. | |
| 2015/0082250 A1 | 3/2015 | Wagner et al. | |
| 2015/0091896 A1 | 4/2015 | Tarquini et al. | |
| 2015/0106752 A1 | 4/2015 | Yang | |
| 2015/0130719 A1 | 5/2015 | Wehrenberg et al. | |
| 2015/0143234 A1 | 5/2015 | Norris, III | |
| 2015/0213604 A1 | 7/2015 | Li et al. | |
| 2015/0227611 A1 | 8/2015 | Bao et al. | |
| 2015/0287162 A1 | 10/2015 | Canan et al. | |
| 2015/0363409 A1 | 12/2015 | Wood et al. | |
| 2016/0019388 A1 | 1/2016 | Singla et al. | |
| 2016/0026702 A1* | 1/2016 | McGregor | G06F 16/24 |
| | | | 707/624 |
| 2016/0026717 A1* | 1/2016 | Kelsey | H04L 63/105 |
| | | | 707/754 |
| 2016/0140146 A1* | 5/2016 | Wexler | G06F 16/5846 |
| | | | 707/741 |
| 2016/0358311 A1 | 12/2016 | Chen et al. | |
| 2017/0019587 A1 | 1/2017 | Matas et al. | |
| 2017/0083620 A1 | 3/2017 | Chew et al. | |
| 2017/0185670 A1* | 6/2017 | Dua | G06F 16/5866 |
| 2017/0244959 A1 | 8/2017 | Ranjeet et al. | |
| 2017/0357409 A1 | 12/2017 | Wagner et al. | |
| 2018/0091732 A1 | 3/2018 | Wilson et al. | |

FOREIGN PATENT DOCUMENTS

| | | |
|---|---|---|
| CN | 101196786 A | 6/2008 |
| CN | 101291409 A | 10/2008 |
| EP | 1124175 A2 | 8/2001 |
| EP | 1289210 A2 | 3/2003 |
| EP | 1962241 A1 | 8/2008 |
| FR | 2830093 A3 | 3/2003 |
| GB | 2420260 A | 5/2006 |
| JP | H03217976 A | 9/1991 |
| JP | H06309138 A | 11/1994 |
| JP | H11164175 A | 6/1999 |
| JP | H11168694 A | 6/1999 |
| JP | 2000112997 A | 4/2000 |
| JP | 2000138883 A | 5/2000 |
| JP | 2000148591 A | 5/2000 |
| JP | 2000221879 A | 8/2000 |
| JP | 2000244673 A | 9/2000 |
| JP | 2000350134 A | 12/2000 |
| JP | 2001136303 A | 5/2001 |
| JP | 2001265481 A | 9/2001 |
| JP | 2001309019 A | 11/2001 |
| JP | 2003338975 A | 11/2003 |
| JP | 2004032346 A | 1/2004 |
| JP | 2004145291 A | 5/2004 |
| JP | 2004153832 A | 5/2004 |
| JP | 2004288208 A | 10/2004 |
| JP | 2004336536 A | 11/2004 |
| JP | 2004336711 A | 11/2004 |
| JP | 2005038101 A | 2/2005 |
| JP | 2005092386 A | 4/2005 |
| JP | 2005100084 A | 4/2005 |
| JP | 2005515530 A | 5/2005 |
| JP | 2005150836 A | 6/2005 |
| JP | 2005175991 A | 6/2005 |
| JP | 2005182320 A | 7/2005 |
| JP | 2005202483 A | 7/2005 |

(56) References Cited

FOREIGN PATENT DOCUMENTS

| | | |
|---|---|---|
| JP | 2005202651 A | 7/2005 |
| JP | 2005303728 A | 10/2005 |
| JP | 2005321516 A | 11/2005 |
| JP | 2005339420 A | 12/2005 |
| JP | 2006067344 A | 3/2006 |
| JP | 2006139340 A | 6/2006 |
| JP | 2006140865 A | 6/2006 |
| JP | 2006195592 A | 7/2006 |
| JP | 2006236249 A | 9/2006 |
| JP | 2007515775 A | 6/2007 |
| JP | 2007525775 A | 9/2007 |
| JP | 2008059614 A | 3/2008 |
| JP | 2008106469 A | 5/2008 |
| JP | 2008236794 A | 10/2008 |
| JP | 2013140171 A | 7/2013 |
| KR | 20050101162 A | 10/2005 |
| KR | 20060032793 A | 4/2006 |
| WO | 2003023593 A1 | 3/2003 |
| WO | 2003081458 A1 | 10/2003 |
| WO | 2005093550 A2 | 10/2005 |
| WO | 2005103863 A2 | 11/2005 |
| WO | 2006125271 A1 | 11/2006 |
| WO | 2008030779 A2 | 3/2008 |
| WO | 2009005487 A1 | 1/2009 |
| WO | 2009082814 A1 | 7/2009 |
| WO | 2009150425 | 12/2009 |
| WO | 2009155991 A1 | 12/2009 |
| WO | 2010059188 A2 | 5/2010 |

OTHER PUBLICATIONS

Cyr, Jim, "Apple Watch—Customize Modular Watch Face", May 13, 2015, Retrieved from the Internet URL https://www.youtube.com/watch?v=02W93HbKIK8 [Retrieved on Sep. 16, 2012], 2 pages.

Geek, "How to Put the Day of the Week into the Windows Taskbar Clock", 2014, Retrieved from the Internet: URL: https://www.howtogeek.com/194103/how-to-put-the-day-of-the-week-into-the-window-task-bar-clock/ [Retrieved on Mar. 10, 2017], 3 pages.

Karlson et al., "AppLens and Launch Tile: Two Designs for One-Handed Thumb Use on Small Devices," CHI 2005, Papers: Small Devices 1, Apr. 2-7, 2005, pp. 201-201.

Liao T. Warren, "Clustering of time series data-a survey," Pattern Recognition, Elsevier, GB, vol. 38, No. 11, Nov. 1, 2005 (Nov. 1, 2005), pp. 1857-1874, XP027610890, ISSN: 0031-3203 [retrieved Nov. 1, 2005].

Mozilla Developer Network, "Mouse Gesture Events," May 14, 2009, Retrieved from the Internet: URL: https://developer.mozilla.org/en-US/docs/Web/Guide/Events/Mouse_gesture_events [Retrieved on May 17, 2011], 3 pages.

Van Wijk Hark J., et al., "Cluster and Calendar based Visualization of Time Series Data," Information Visualization, 1999, (info vis '99), Proceedings, 1999 IEEE Symposium on San Francisco, Ca USA Oct. 24-29, 1999, Los Alamitos, CA USA, IEEE Comput. Soc., US, Oct. 24, 1999 (Oct. 24, 1999), pp. 4-9, 140 XP101356933, DOI: 10.1109/INVIS.1999.801851 ISBN:978-0-7695-0431-5.

Gallagher et al., Image Annotation Using Personal Calanders as Context, AMC Intl. Conf. on Multimedia 2008.

International Search Report and Written Opinion received in corresponding PCT Application No. PCT/US2011/048169, dated Oct. 21, 2011.

International Search Report and Written Opinion issued in PCT Application No. PCT/US2019/030484, dated Aug. 19, 2019 in 11 pages.

\* cited by examiner

```
┌─────────────────────────────────────────────────────────────────────┐
│ A COMPUTER READABLE MEDIUM STORING A PLURALITY OF INSTRUCTIONS THAT,│
│ WHEN EXECUTED BY ONE OR MORE PROCESSORS OF A COMPUTING DEVICE WITH  │
│ A DISPLAY, CONFIGURE THE ONE OR MORE PROCESSORS TO PERFORM          │
│ OPERATIONS COMPRISING:                                              │
└─────────────────────────────────────────────────────────────────────┘
                                  │
                                  ▼
┌─────────────────────────────────────────────────────────────────────┐
│ GENERATING A GRAPHICAL USER INTERFACE FOR SEARCHING A DIGITAL       │ ── 1402
│ ASSET COLLECTION ON THE COMPUTING DEVICE;                           │
└─────────────────────────────────────────────────────────────────────┘
                                  │
                                  ▼
┌─────────────────────────────────────────────────────────────────────┐
│ PROVIDING A SEARCH FIELD IN A FIRST AREA OF THE GRAPHICAL USER      │
│ INTERFACE, THE SEARCH FIELD FOR RECEIVING TEXT ASSOCIATED WITH THE  │ ── 1404
│ DIGITAL ASSET COLLECTION OF THE COMPUTING DEVICE; AND               │
└─────────────────────────────────────────────────────────────────────┘
                                  │
                                  ▼
┌─────────────────────────────────────────────────────────────────────┐
│ PROVIDING AT LEAST ONE USER INTERFACE ELEMENT INCLUDING A FIRST     │
│ KEYWORD TAG FOR AT LEAST ONE SEARCH CATEGORY IN A SECOND AREA OF    │
│ THE DISPLAY, WHEREIN THE AT LEAST ONE USER INTERFACE ELEMENT IS     │
│ GENERATED BY THE COMPUTING DEVICE FROM A KNOWLEDGE GRAPH OF THE     │ ── 1406
│ DIGITAL ASSET COLLECTION, AND A SEARCH OF THE DIGITAL ASSET         │
│ COLLECTION OF THE COMPUTING DEVICE FOR RELEVANT CONTENT OF A        │
│ DESIRED SEARCH CATEGORY IS INITIATED BY ACTIVATING A DESIRED USER   │
│ INTERFACE ELEMENT.                                                  │
└─────────────────────────────────────────────────────────────────────┘
```

DIGITAL ASSET SEARCH USER INTERFACE

CROSS-REFERENCES TO RELATED APPLICATIONS

This application claims priority to and incorporates by reference commonly-owned U.S. Patent Application Ser. No. 62/668,181, filed May 7, 2018, entitled "Digital Asset Search User Interface," in its entirety and for all purposes. This application incorporates by reference commonly-owned U.S. patent application Ser. No. 15/391,276, filed Dec. 27, 2016, entitled "Knowledge Graph Metadata Network Based on Notable Moments," in its entirety and for all purposes.

BACKGROUND

Modern computing devices provide the opportunity to store thousands of digital assets (e.g., digital photos, digital video, etc.) in an electronic device. Users often show their digital assets to others by presenting the images on the display screen of the computing device. Finding a particular digital asset or a group of related digital assets can take time and result in a poor user experience. Sorting thousands, or tens of thousands, of digital assets manually into digital albums or folders can be time consuming and may make it difficult to link a single digital asset with multiple collections. Managing a digital asset collection can be a resource-intensive exercise for users. A user may have to sort through many irrelevant digital assets prior to finding one of interest. Scrolling through hundreds or thousands of pictures is burdensome and results in a poor user experience.

BRIEF SUMMARY

Embodiments of the present disclosure can provide devices, methods, and computer-readable medium for implementing user interface for searching digital assets in a digital asset collection. The present disclosure describes the implementation of one or more embodiments of a user interface that enables a user to quickly and easily filter and search digital assets in a digital asset collection. The disclosed techniques allow for rapid recall of desired assets with minimal keystrokes, linking assets into logical collections, and providing an overall improved user experience.

In various embodiments, the graphical user interface helps overcome the difficulties in searching a digital asset collection through the techniques described in the present disclosure. In various embodiments, a computing device can include one or more memories, one or more processors in communication with the one or more memories, and a display with a graphical user interface. The graphical user interface can be configured for displaying a search field in a first area of the display of a digital asset collection page of the computing device. The search field can receive text associated with a search of digital asset collection of the computing device. The graphical user interface can be further configured for displaying at least one representative multimedia icon including a first keyword tag, where the keyword tag is derived by the computing device from a knowledge graph of the digital asset collection. The multimedia icon and keyword tag can be displayed for at least one search category in a second area of the display, where the representative multimedia icon represents at least one asset within the digital asset collection associated with the first keyword tag. The graphical user interface can receive a selection of the at least one representative multimedia icon of a desired search category corresponding to the first keyword tag. The graphical user interface can allow a user to initiate a search of the digital asset collection of the computing device for relevant digital assets of the desired search category. The graphical user interface can display a subset of the digital asset collection depending on the desired search category on the display of the computing device.

In various embodiments, the graphical user interface of the computing device can be configured for displaying at least one suggested search term based at least in part on a correlation between a first set of metadata of the desired search category and a second set of metadata of the digital assets. The graphical user interface can display a second keyword tag associated with the at least one suggested search term. The technique can further filter the digital assets of the digital asset collection to exclude certain digital assets that are not related to the at least one suggested search term, the further filtering creating a further revised digital asset collection; and displaying the further revised asset collection on the display.

In various embodiments, the at least one suggested search term can include identifying text and a collection icon. The collection icon can identify a collection of the suggested search term in the digital asset collection.

In various embodiments, the graphical user interface of the computing device can be configured for displaying at least one suggested search term based at least in part on a correlation between one or more textual entries in the search field and a set of metadata of the digital assets. The graphical user interface can display a second keyword tag associated with the at least one suggested search term, further filtering the digital assets of the digital asset collection to exclude certain digital assets that are not related to the at least one suggested search term. The further filtering can create a further revised digital asset collection and the graphical user interface can display the further revised asset collection on the display.

In various embodiments, the graphical user interface of the computing device is configured for autocompleting a textual entry of a portion of a search term entered into a search field depicted in an area of the user interface, where the autocompleting is based at least in part on metadata stored in the knowledge graph and a weighted criteria. The weighted criteria can consider at least one of: a quantity of the digital assets for the keyword tag that matches a completed search term; a position of a matched term in the keyword tag for multi-term keyword tags, where the matched term matches the completed search term; an asset category of the keyword tag that corresponds to the completed search term; a position of the keyword tag for the completed search term, where the position is in a ranking of the keyword tags in a selected asset category; or a quantity of matched keyword tags for the completed search term; and displaying, on the user interface, the completed search term in the search field.

In various embodiments, the graphical user interface of the computing device can be configured for displaying one or more multimedia icons in a plurality of collections as determined at least in part by the keyword tag associated with the multimedia icon, where each collection is displayed in an individual area of the display.

In various embodiments, the collections can include events, people, places, categories, and groups.

In various embodiments, the graphical user interface of the computing device can be configured for scrolling a list of multimedia icons in at least one collection of multimedia icons at least in response to identification of a hand gesture.

In various embodiments, the multimedia icon can include a depiction of a representative asset in the digital asset collection corresponding to the first keyword tag.

In various embodiments, a technique for displaying a graphical user interface on a computing device with a display can include displaying a search field in a first area of the display of a digital asset collection page of the computing device. The search field can receive text associated with a digital asset collection of the computing device. The technique further can include displaying at least one user interface element including a first keyword tag. The keyword tag can be generated by the computing device from a knowledge graph of the digital asset collection, for at least one search category in a second area of the display, where the user interface element represents at least one asset within the digital asset collection associated with the first keyword tag. The technique includes receiving a selection of the at least one user interface element of a desired search category corresponding to the first keyword tag. Next, the technique includes initiating a search of the digital asset collection of the computing device for relevant content of the desired search category. The technique includes displaying a subset of the digital asset collection depending on the desired search category on the display. In various embodiments, each suggested search term can include an asset count to inform a user the number of digital assets responsive to the search request.

In various embodiments, the technique can also include displaying a suggested search term in the graphical user interface based at least in part on a correlation between a first set of metadata of the desired search category and a second set of metadata of the digital assets. The technique includes displaying a second keyword tag associated with the suggested search term. Next, the technique includes further filtering the digital assets of the digital asset collection to exclude certain digital assets that are not related to the suggested search term. The further filtering can create a further revised digital asset collection. The technique can include displaying the further revised asset collection on the display.

In various embodiments, the suggested search term can include identifying text and a collection icon, where the collection icon identifies a collection of the suggested search term in the digital asset collection.

In various embodiments, the technique can include displaying on the graphical user interface a suggested search term based at least in part on a correlation between one or more textual entries in the search field and a set of metadata of the digital assets. The technique can include displaying a second keyword tag associated with the suggested search term. The technique can also include further filtering the digital assets of the digital asset collection to exclude certain digital assets that are not related to the suggested search term. The further filtering can create a further revised digital asset collection. The technique can include displaying the further revised asset collection on the display.

In various embodiments, the technique can include autocompleting a textual entry of a portion of a search term entered into a search field depicted in an area of the user interface, where the autocompleting is based at least in part on metadata stored in the knowledge graph and a weighted criteria. The weighted criteria can consider at least one of: a quantity of the digital assets for the keyword tag that matches a completed search term; a position of a matched term in the keyword tag for multi-term keyword tags, where the matched term matches the completed search term; an asset category of the keyword tag that corresponds to the completed search term; a position of the keyword tag for the completed search term, where the position is in a ranking of the keyword tags in a selected asset category; or a quantity of matched keyword tags for the completed search term; and displaying, on the user interface, the completed search term in the search field.

In various embodiments, the technique can further include the graphical user interface displaying one or more multimedia icons in a plurality of collections as determined at least in part by the keyword tag associated with the user interface element, where each collection can be displayed in an individual area of the display.

In various embodiments, a computer readable medium storing a plurality of instructions that, when executed by one or more processors of a computing device with a display, configure the one or more processors to perform operations including generating a graphical user interface for searching a digital asset collection on the computing device. The operations can include providing a search field in a first area of the graphical user interface, the search field for receiving text associated with the digital asset collection of the computing device. The operations can also include providing at least one user interface element including a first keyword tag for at least one search category in a second area of the display, where the at least one user interface element is generated by the computing device from a knowledge graph of the digital asset collection, and a search of the digital asset collection of the computing device for relevant content of a desired search category is initiated by activating a desired user interface element.

In various embodiments, the computer readable medium further can provide instructions for operations for displaying on the graphical user interface a suggested search term based at least in part on a correlation between a first set of metadata of the desired search category and a second set of metadata of the digital assets. The operations can include displaying a second keyword tag associated with the suggested search term. The operations can include further filtering the digital assets of the digital asset collection to exclude certain digital assets that are not related to the suggested search term, the further filtering creating a further revised digital asset collection. Finally, the operations can also include displaying the further revised asset collection on the display.

In various embodiments, the suggested search term can include identifying text and a collection icon, where the collection icon can identify a collection of the suggested search term in the digital asset collection.

In various embodiments, the operations can also include displaying a suggested search term based at least in part on a correlation between one or more textual entries in the search field and a set of metadata of the digital assets. The operations can include displaying a second keyword tag associated with the suggested search term. The operations can include further filtering the digital assets of the digital asset collection to exclude certain digital assets that are not related to the suggested search term. The further filtering can create a further revised digital asset collection. The operations can include displaying the further revised asset collection on the display.

In various embodiments, the operations can include autocompleting a textual entry of a portion of a search term entered into a search field depicted in an area of the user interface, where the autocompleting is based at least in part on metadata stored in the knowledge graph and a weighted criteria. The weighted criteria can consider at least one of: a quantity of the digital assets for the keyword tag that matches a completed search term; a position of a matched term in the keyword tag for multi-term keyword tags, where the matched term matches the completed search term; an asset category of the keyword tag that corresponds to the completed search term; a position of the keyword tag for the completed search term, where the position is in a ranking of the keyword tags in a selected asset category; or a quantity of matched keyword tags for the completed search term; and displaying, on the user interface, the completed search term in the search field.

In various embodiments, the graphical user interface can display thumbnail images for the Top 8 search results with accompanying metadata responsive to the search query.

The following detailed description together with the accompanying drawings will provide a better understanding of the nature and advantages of the present disclosure.

BRIEF DESCRIPTION OF THE DRAWINGS

FIG. 14 is another flow diagram to illustrate providing a user interface for searching digital assets in a digital asset collection as described herein, according to at least one example.

DETAILED DESCRIPTION

Figure 1:
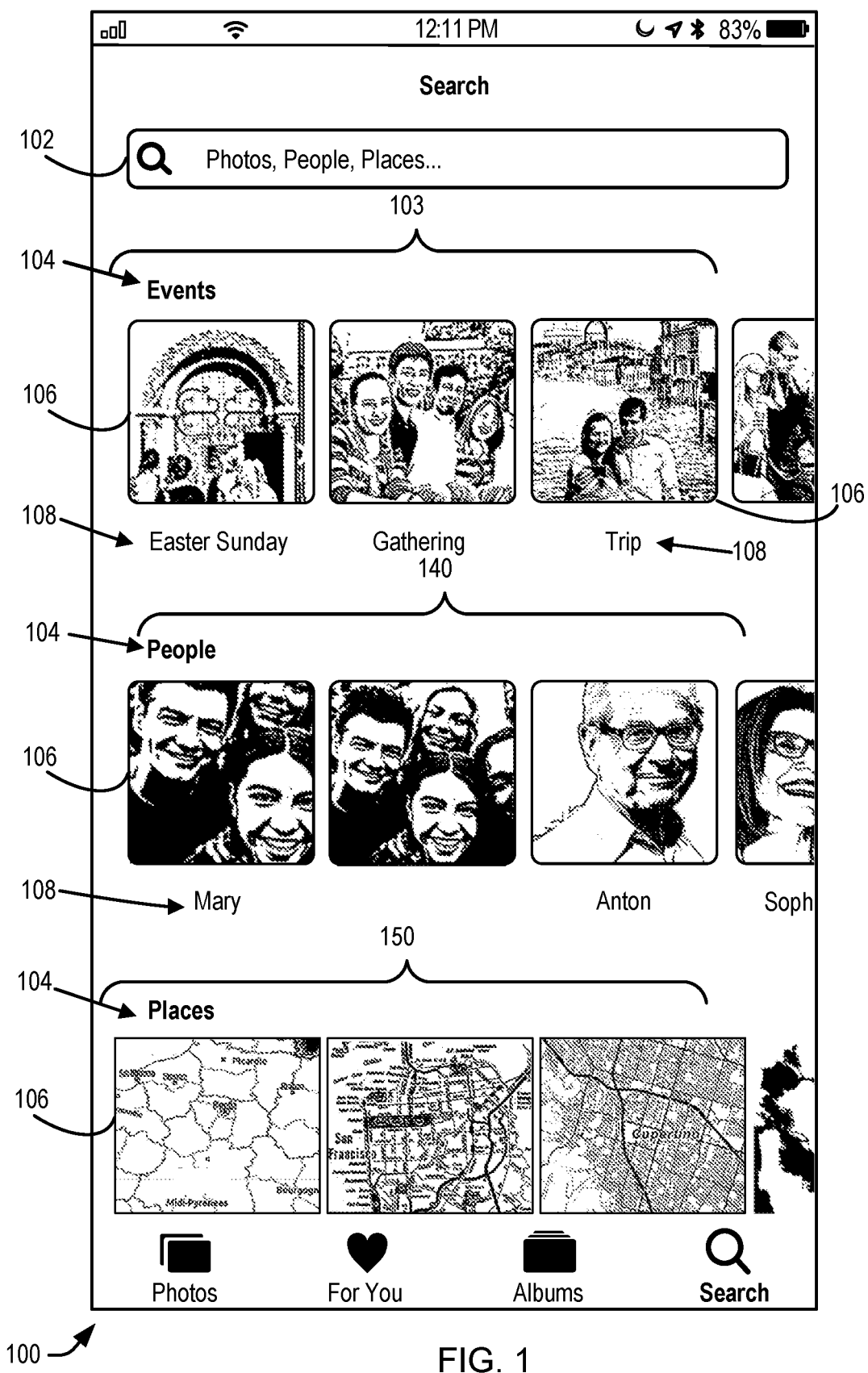
FIG. 1 illustrates an example user interface, specifically a digital asset search page, in accordance with at least one embodiment.

Certain embodiments of the present disclosure relate to devices, computer-readable medium, and methods for generating graphical user interfaces for implementing various techniques for searching digital assets in a computing device. In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. The present disclosure describes a user interface (UI) to allow for searching various digital assets (e.g., digital photos, digital video, etc.) stored in a digital asset collection on computing device.

Embodiments of the present disclosure are directed to, among other things, improving a user experience concerning the accessing and searching a digital content collection. As used herein, a "digital asset" may include data that can be stored in or as a digital form (e.g., digital image, digital video, digital voice recording). As used herein, a "digital asset collection" refers to multiple digital assets that may be stored in one or more storage locations. The one or more storage locations may be spatially or logically separated. As used herein, a "knowledge graph" refers to a metadata network associated with a collection of digital assets comprising correlated metadata assets describing characteristics associated with digital assets in the digital asset collection. As used herein, a "node" in a metadata network refers to a metadata asset associated with one or more digital assets in a digital asset collection. The examples and contexts of such examples provided herein are intended for illustrative purposes and not to limit the scope of this disclosure.

A user interface that implements various different features to improve the search process of the digital asset collection are disclosed herein. These features include zero keyword/contextual keyword, top auto completion, and next keyword suggestion. The zero keyword/contextual keyword feature can present multimedia content icons and searchable keywords in a user interface to allow a user to search the digital asset simply by tapping on one of these keywords. The top auto completion feature can enable auto-completion of text suggestions in the search field of a user interface based on various heuristics to ensure the search produces diverse and relevant results. The next keyword suggestion feature can predicts and present a next search term based on learned properties about the digital asset collection in a user interface.

In one embodiment, the disclosed technique can generate a user interface for generating a zero keyword or contextual keyword search of the digital assets. In this technique, one or more user interface elements in conjunction with keyword tags can be displayed that describe characteristics associated with the digital assets. The technique can be performed by one or more processors of a computing device using a knowledge graph. The knowledge graph can include a plurality of nodes that represent associations between digital assets and asset categories. The digital assets can be stored in a digital asset collection of the computing device, where each category of the asset categories corresponds to a respective keyword tag of a plurality of keyword tags. In accordance with various embodiments, the techniques can involve accessing the knowledge graph to retrieve the plurality of keyword tags based at least in part on an action defined by the computing device. A particular digital asset of the digital asset collection can be selected for each of the plurality of keyword tags based at least in part on the particular digital asset associated with a particular node of the plurality of nodes of the knowledge graph. The techniques can involve preparing for display a user interface that includes user interface elements. Each user interface element of the user interface elements can include a keyword tag of the multiple of keyword tags and a corresponding multimedia icon that represents a corresponding selected digital asset. The technique can further involve receiving a selection of at least one of the user interface elements, the selection indicating a desired search category based at least in part on a corresponding keyword tag for the selection. This technique can further include filtering the digital assets of the digital asset collection to exclude certain digital assets that are not related to the desired search category. This filtering can be accomplished by the one or more processors of the computing device. The filtering can create a revised digital asset collection. The technique can include initiating a search of the revised digital asset collection of the computing device for digital assets with metadata corresponding to the corresponding keyword tag for the selection and preparing for display a second user interface that includes second user interface elements corresponding to the revised digital asset collection. Each second user interface element of the multiple second user interface elements can include a second keyword tag and a second corresponding multimedia icon based at least in part on the desired search category.

In various embodiments, the techniques can include calculating a priority score for the plurality of keyword tags for each asset collection represented by items including the multimedia icon in the keyword tag. The priority score can be based on a criteria. In accordance with various embodiments, the multimedia icons and the keyword tags can be sorted and displayed by ranking of the priority score. Contextual keywords can be displayed prior to Zero Keywords using the time distance between a current date and a date of the contextual event in addition to heuristics (e.g., contextual locations based on current location of the computing device can be displayed prior to contextual locations prior to recent events.)

The priority score for the display of keyword tags for Zero Keyword suggestions can differ based on the collection the keyword tags. For the "People" collection, the priority score can be based on criteria that can include: a number of assets/collection with a certain person in the digital asset collection; a relationship of the device owner with the certain person (e.g., spouse, friend, family member, colleague, coworker, etc.); and if the certain person can be associated with one or more social groups, the certain person can be displayed along with the other people from these social groups. For the social "Groups" collection, the priority score can be based on criteria that can include: a number of assets/collections associated with the social group; and a social group coherence score based on the fact that the people belonging to the social group mostly appear within this social group in the data asset collection. For the "Places" collection, the priority score can be based on criteria that can include: a number of assets/collections at that locations (i.e., location can be approximated using time/distance clustering for collections); if the place is a frequent location in the digital asset collection; If the place is identified as a Home/Work location in the contact card for the user; if the place is a location of interest detected by GPS data of the device (i.e., without need for the digital asset collection); various heuristics can allow favoring the right scale of locations (e.g., city, state, country) based on your digital asset collection. These factors can consider the hierarchy of locations in the knowledge graph and can be based on how many children/siblings a location node have in the hierarchy of the knowledge graph. For the categories ("Scenes") collection, the priority score can be based on criteria that can include: a number of assets/collections with this scene; the level of this scene in the scene taxonomy; and a whitelist of scenes that are great to display as Zero Keyword. For "Events" (knowledge graph meaning) collections, the priority score can be based on criteria that can include: a number of assets/collections with this meaning or any parent of this meaning in the graph meaning hierarchy; and a whitelist of meanings that are great to display as Zero Keyword. Once the digital asset management module/logic determines the priority scores for each of the collections, each collection for the Zero Keyword based on their scores and we use a heuristic based on mean and standard deviation to cut the top selection of Zero Keyword for displaying.

The priority score for the display of contextual keyword tags can differ based on the collection the keyword tags. For the "People" collection, the priority score for contextual keyword suggestions can be based on criteria that can include: people currently located in proximity of the computing device; people who had their birthday recently or will have it soon; and People the user has seen recently. For the social "Group" collection, the priority score for contextual keyword suggestions can be based on criteria that can include: a social group in which members of the social group are currently located in proximity of the computing device; a social group the user has seen recently. For the "Places" collection, the priority score for contextual keyword suggestions can be based on criteria that can include: places in close proximity to the computing device; and meaningful places the user has visited recently. For the "Events" (meanings) collection, the priority score for contextual keyword suggestions can be based on criteria that can include: meanings from a user's recent events (e.g., museum, theme park, wedding, etc.). For the "Scenes" collection, the priority score for contextual keyword suggestions can be based on criteria that can include: scenes from a user's recent events (and in the scene whitelist). For the Holidays collection, the priority score for contextual keyword suggestions can be based on criteria that can include: past and upcoming holidays that you usually celebrate (e.g., celebration is inferred in the knowledge graph). For the seasons collection, the priority score for contextual keyword suggestions can be based on criteria that can include: a current season, and an immediate past season. For the One Year Ago collection, the priority score for contextual keyword suggestions can be based on criteria that can include: appears if there were digital assets captured on this date a year ago (with a one week span).

In various embodiments, the action that causes the knowledge graph to retrieve the plurality of keyword tags can comprise at least one of the following events: a change to the digital assets in the digital asset collection; a change to a face in the digital asset collection. The face represents a link between an image of a person and an identity of the person. The action can include adding or deleting a selected node of the plurality of nodes of the knowledge graph. The action can also include synchronizing the digital asset collection to a cloud storage application The action can also include a change in a relationship between a first digital asset and a second digital asset.

In various embodiments, the techniques also can include generating the multimedia icon that includes a depiction of a representative digital asset in the digital asset collection corresponding to the keyword tag. In cases in which the digital asset is a video in the digital asset collection, the depiction of the representative asset can be a frame of the video.

In various embodiments, the next keyword suggestion feature can infer the next keyword a user might want to search for in order to refine a search query. This technique can have both the advantage of optimizing the search query and obtains the best possible search results to a user in the shortest number of steps all while displaying search terms that should be familiar to a user because they are based on the assets in the digital asset collection of the user. The next keyword suggestion feature works by the system accessing the knowledge graph to access a plurality of metadata associated with keyword tags.

In various embodiments, the next keyword suggestion technique can derive at least one suggested search term based at least in part on a correlation between a first set of metadata of the desired search category (selected multimedia icon and/or keyword tag) and a second set of metadata of the digital assets of the asset categories. The technique can prepare for display a second keyword tag associated with the at least one suggested search term and further filters the digital assets of the digital asset collection to exclude certain digital assets that are not related to at least one suggested search term. The further filtering can create a further revised digital asset collection. The next keyword suggestion feature can also include classic auto completions found in most search engines. However, the present disclosure can teach an innovative approach to suggestions in order to minimize the amount of characters entered by the user while encouraging the user to refine his or her search as much as possible to find his or her search result. The digital asset management module/logic can achieve the next keyword suggestion by trying to infer the next keyword the user might want to search for to refine his or her search query. However, most search engines can achieve this by looking at statistical correlation between search terms or trying to predict the next search term based on learned existing information. The digital asset management module/logic can analyze the domain space covered by keywords already entered in the search query to infer the next keywords that would best separate the space and theoretically lead one to their results faster. Each time a user enters a keyword, the digital asset management module/logic can find the set of next potential keywords that would maximize the coverage of the currently searchable domain space (e.g., potentially reaching 100%) while minimizing the overlap between the subdomains covered by the updated search queries when adding each suggested next keyword to the existing query. This technique has both the advantage of optimizing the search query to get the user as fast as possible to their next results (in terms of steps) while showing the next keyword suggestions that are familiar to him or her because they come from his or her own collection.

In various embodiments, the at least one suggested search term includes a collection icon. The collection icon identifies a collection of the digital assets associated with the suggested search term in the digital asset collection. For example, the collection icon can include People, Places, Categories, Moments, and Events.

Auto completion suggestions and search fields are often based on statistical data. For example, the suggestions can be learned from a set of user searches or from frequency of terms extracted from large text corpuses. These classic approaches are not applicable or might have limited success in the present situation where searches are specific to each user's digital asset collection. In this case the digital asset management module/logic still wants to ensure the user has the best possible search results. This approach combines different heuristics to ensure the user receives diverse and relevant results.

In various embodiments, the top auto completion feature auto-completes suggestions in the search field based on a weighted criteria in order to provide both a diverse and relevant search results. The top auto completion technique can include autocompleting a textual entry of a portion of a search term entered into a search field depicted in an area of the user interface, where the autocompleting is based at least in part on metadata stored in the knowledge graph and a weighted criteria that considers at least one of: a quantity of the digital assets for the keyword tag that matches a completed search term; a position of a matched term in the keyword tag for multi-term keyword tags, where the matched term matches the completed search term. The asset category of the keyword tag can corresponds to the completed search term; a position of the keyword tag for the completed search term, where the position is in a ranking of the keyword tags in a selected asset category; or a quantity of matched keyword tags for the completed search term. In addition to these criteria, the digital asset management module/logic can add classic criteria such as the search history. In the end, the digital asset management module/logic builds a score by applying a weight to all the criteria in order to return the top results. The criteria in which a position of a matched term in the keyword tag for multi-term keyword tags, where the matched term matches the completed search term can create the diversity in the auto completions as each section can be associated with different categories. Also for the purpose of auto completions, a first positions means higher scores, so that the first element of a section can be picked even if it was not as good as the last element of another section without considering the position in the score. The technique further includes displaying, on the user interface, the completed search term in the search field.

In various embodiments, the weighted criteria can consider a search history of a plurality of historical search terms of historical searches, where the search history can be stored on the computing device.

In various embodiments, the techniques can combine both the top auto completion feature and the next keyword suggestion features. This technique can be accomplished by first deriving at least one suggested search term based at least in part on a correlation between a first set of metadata of the corresponding to the completed search term and a second set of metadata of the digital assets of the asset categories. Next, the technique can include preparing for display a second keyword tag associated with the at least one suggested search term. Finally, the technique can include further filtering the digital assets of the digital asset collection to exclude certain digital assets that are not related to the at least one suggested search term, the further filtering creating a further revised digital asset collection.

In some embodiments, a digital asset management module/logic can filter the search results to display the top digital assets responsive to the search request. In some embodiments, the user interface can display one or more thumbnails for those top images. In some embodiments, the top digital assets can be the Top 2, Top 4, Top 6, Top 8, or an any defined number of "Top" assets. In some embodiments, the thumbnails can be displayed in one or more rows of thumbnails. The thumbnails can display the Top 8 digital assets in two rows with four thumbnails in each row. In some embodiments, the assets can be displayed in chronological order with the oldest thumbnail first and the newest thumbnail last. In some embodiments, the assets can be displayed in the reverse chronological order (newest to oldest). In some embodiments, the assets can be displayed in order of asset score with highest scored asset in a first position and the lowest asset score in a last position. In some embodiments, the first position can be the left most thumbnail in a first row of two rows of thumbnails. In some embodiments, the last position can be the right most thumbnail in a second row of two rows of thumbnails. In some embodiments, the digital asset thumbnails can be displayed in order of score, with the thumbnail for the digital asset for the Top asset being displayed first and the thumbnail for the asset with the highest score displayed last. If the search query contains more the a preset number of assets (e.g., eight assets), a "Show All" button is displayed which if selected displays the full set of assets. If a user selects one of the Top digital assets, the assets can be displayed in a carrousel allowing a user to scroll through the assets using a hand gesture on the display screen.

In some embodiments, the user interface can calculate and display suggestion counts for search results. For example, in addition to displaying suggested search terms, the digital asset management module/logic can display the number of digital asset results if the additional search terms are selected. In some embodiments, the suggestion counts can be shown on a right side of the display. In some embodiments, the digital asset management module/logic can calculate and display the total number of digital assets (e.g., digital photos or videos) for the digital assets responsive to the search request. The suggestion count can be computed by calculating the number of results for a suggestion for the given query. The digital asset management module/logic can de-duplicate the number of digital assets in the search results when multiple suggestions are folded together. The deduplication helps to ensure the count can be representative of the number of results the user will see after selecting it.

As used herein, a "knowledge graph," a "knowledge graph metadata network," a "metadata network," and their variations refer to a dynamically organized collection of metadata describing one or more digital assets (e.g., one or more groups of digital assets in a digital asset collection, one or more digital assets in a digital asset collection, etc.) used by one or more computer systems for deductive reasoning. The knowledge graph is created using a plurality of metadata assets. In some embodiments, the digital asset management module/logic can enable the system to generate and use and knowledge graph of the digital asset metadata as a multidimensional network. Each metadata asset can describe a characteristic associated with one or more digital assets in the digital asset collection. Each metadata asset can be represented as a node in the metadata network. A metadata asset can be correlated with at least one other metadata asset. Each correlation between metadata assets can be represented as an edge in the metadata network that is between the nodes representing the correlated metadata assets. The keyword tags are generated using the knowledge graph, which is constructed from the plurality of metadata associated with the digital assets in a digital asset collection. Further explanation for using or generating a knowledge graph can be found in U.S. patent application Ser. No. 15/391,276, filed Dec. 27, 2016, entitled "Knowledge Graph Metadata Network Based on Notable Moments," which is incorporated by reference in its entirety and for all purposes.

FIG. 1 illustrates an example user interface, specifically a digital asset search page in accordance with at least one embodiment of the present disclosure. The user interface 100 displays a search field 102 in a first area of the digital asset search page. The search field 102 is configured to receive one or more characters of text that is used to search the digital assets in the digital asset collection. The search field 102 is depicted in a top portion of the digital asset search page but can be configured for display in any portion of the page. In a second area of the display, a plurality of digital asset collections 103 labeled with a collection identifier 104 can be displayed. In some embodiments, the collections 103 can include photos, people, places, events, categories, and groups. Each collection 103 displays a plurality of multimedia content icons (user interface elements) 106 with associated keyword tags 108. The multimedia content icon 106 displays a thumbnail image that is representative of an asset in the search results for digital assets associated with the associated keyword tag 108. Therefore, at least one of the digital assets in the digital asset collection associated with the multimedia content icon search results will contain the digital image/video frame displayed as the thumbnail image. The user interface 100 allows the multimedia content icons 106 to be scrolled at least in response to identification of a hand gesture. In some embodiments, the hand gesture can be received via a touchscreen display of the computing device. In some embodiments, the hand gesture results in the multimedia content icons 106 and associated keyword tags 108 being scrolled horizontally. In some embodiments, a vertical hand gesture results in a vertical scrolling of the digital asset search page providing for display of additional collections 103. Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

The events collection 103 presents a plurality of multimedia content icons 106 and associated keyword tags 108, where each multimedia content icon 106 and associated keyword tag 108 represents a collection of digital assets stored in the digital asset collection. Each digital includes corresponding metadata that associates the digital asset with an event described by the associated keyword tag 108. For example, the first keyword tag is labeled "Easter Sunday" and selecting the associated multimedia content icon 106 for "Easter Sunday" would result in filtering the digital assets to exclude any assets not related to an event labelled "Easter Sunday." The search engine references the knowledge graph to determine the multimedia content icons 106 and keyword tags 108 based on a plurality of metadata for each of the digital assets in the digital asset collection. The keyword tags 108 are associated by the metadata of the digital assets in the digital asset collection.

The People collection 140 with associated collection identifier 104 presents a plurality of multimedia content icons 106 and associated keyword tags 108, where each multimedia content icon 106 and associated keyword tag 108 represents a collection of digital assets stored in the digital asset collection. Each digital asset contains metadata that associates the digital asset with a person or persons depicted in the multimedia content icon 106 and associated keyword tag 108. For example, the first multimedia content icon 106, depicted in FIG. 1, has an associated keyword tag 108 labeled "Mary" and selecting the associated multimedia content icon 106 would result in filtering the digital assets to exclude any assets not related to "Mary." In some embodiments, the keyword tag 108 is associated with images of persons stored in a contact list of the computing device. In some embodiments, the keyword tag receives information from image analysis and a correlation with other labeled digital assets stored in the digital asset collection. In some embodiments, a user may identify the assets by storing them an a digital asset folder that may be labeled with the identity of the person in the image.

The Places collection 150 will be further described below. The user interface 100 depicts a plurality of icons allowing for additional organizational tools for management of the digital asset collection. The icons can include an "albums" icon, an "Favorites" icon (labelled "For You"), and a "Photos" icon. As shown in FIG. 1, the "Search" feature is selected. Selecting the "albums" icon will direct the user to an albums feature for the digital assets. Selecting the "Favorites" icon will direct the user to a "Favorites" page. Selecting "Photos" will direct the user to a page which lists digital assets in chronological order.

Figure 2:
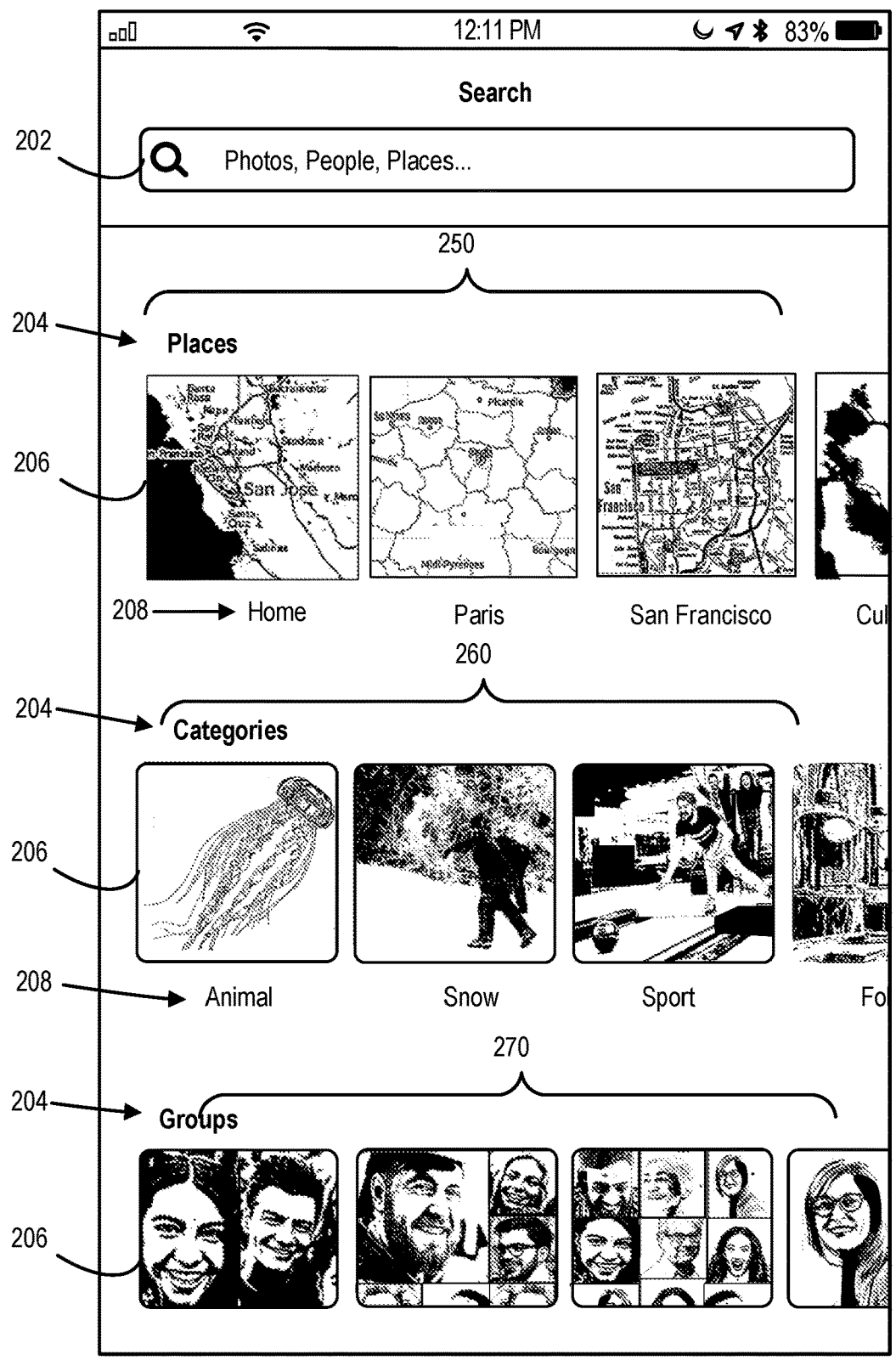
FIG. 2 illustrates another example user interface for digital asset search, specifically another example of a digital assets search page, in accordance with at least one embodiment.

FIG. 2 illustrates another example user interface for digital asset search, specifically another example of a digital assets search page, in accordance with at least one embodiment.

FIG. 2 illustrates a continuation of the digital asset management user interface of FIG. 2. The user interface 200 depicted in FIG. 2 can be accessed by scrolling down from the user interface 200 depicted in FIG. 2. The user can return to user interface 100 by scrolling up on the display. In some embodiments, the scrolling is in response to identification of a hand gesture by the touch screen display of the computing device. The user interface 200 presents a search field 202 in a first area of the display. The user interface 200 depicts the collections for Places, Categories, and Groups.

The Places collection 250 with associated collection identifier 204 presents a plurality of multimedia content icons 206 and associated keyword tags 208, where each multimedia content icon 206 and associated keyword tag 208 represents a collection of digital assets stored in the digital asset collection. Each digital asset includes metadata that associates the digital asset with a geographic place depicted in the multimedia content icon 206 and associated keyword tag 208. The Places collection 250 depicts exemplary collections for the keyword tags 208 labelled "Home," "Paris," and "San Francisco." The digital asset management module/logic will identify a "Home" identifier for the user of the computing device based on the user's activity. The exemplary "Home" depicted in FIG. 2 is San Jose, Calif. Instead of displaying a thumbnail image representing a representative asset in the collection for each of the multimedia content icons 206 depicted for the Places icon, the disclosed technique generates an image of a map of the location. Therefore, in the "Home" collection there are no digital assets with an image of a map of San Jose, Calif. Selection of the associated multimedia content icon 206 for "Home" would result in filtering the digital assets to exclude any assets not containing location metadata related to San Jose, Calif. The "Paris" and "San Francisco" are exemplary places and a user would have additional multimedia content icons 206 and keyword tags 208 associated with relevant places where the digital assets have been captured. The capture location for the digital assets is identified by location metadata associated with each digital asset. The digital asset management module/logic decides which multimedia content icons 206 and associated keyword tags 208 to display and in which order the multimedia content icons 206 and associated keyword tags 208 are displayed.

The Categories collection 260 with associated collection identifier 204 presents a plurality of multimedia content icons 206 and associated keyword tags 208, where each multimedia content icon 206 and associated keyword tag 208 represents a collection of digital assets stored in the digital asset collection. Each digital asset includes metadata that associates the digital asset with a category depicted in the multimedia content icon 206 and associated keyword tag 208. The user interface 200 depicted in FIG. 2 depicts exemplary topics for the keyword tags 208 labelled "Animal," "Snow," and "Sport." The digital asset management module/logic through access of the knowledge graph generates representative multimedia content icons 206 and associated keyword tags 208 that are relevant to the digital assets stored in the digital asset collection based on a plurality of metadata for the digital assets. For example, selection of the associated multimedia content icon 206 for "Animal" would result in filtering the digital assets to exclude any assets not containing metadata related to "Animal." Similarly, selection of the associated multimedia content icon 206 for "Snow" or "Sport" would result in filtering the digital assets to exclude any assets not containing metadata related to "Snow" or "Sport." The digital asset management module/logic through access of the knowledge graph decides which multimedia content icons 206 and associated keyword tags 208 to display and in which order the multimedia content icons 206 and associated keyword tags 208 are displayed.

The social Groups collection 270 with associated collection identifier 204 presents a plurality of multimedia content icons 206 and associated keyword tags 208, where each multimedia content icon 206 and associated keyword tag 208 represents a collection of digital assets stored in the digital asset collection. Each digital asset includes metadata that associates the digital asset with a group of persons depicted in the multimedia content icon 206 and associated keyword tag 208. The user interface 200, depicted in FIG. 2, presents exemplary multimedia content icons 206 depicting multiple persons in the same image or image collages including multiple persons depicted in the same image. Unlike most other collections, the Group collections may not depict the keyword tags 208 associated with each group. The multimedia content icon 206 for each group can have a plurality of different images representing persons associated with each other in different digital assets contained within the group. A social group multimedia content icon 306 can have from two to nine people associated with the group. In some embodiments, the multimedia content icon may present any of two images to nine images depicted. The collage of the multiple images in the multimedia content icon can depend on the number of digital assets responsive to the people metadata for the Group. Selection of the associated multimedia content icon 206 for one of the Groups will result in returning the digital assets containing all the persons and all the asset collections containing all the persons OR associated with the social group comprised of all these people. The digital asset management module/logic through access of the knowledge graph decides which multimedia content icons 206 to display for the Groups and in which order the multimedia content icons 206 are displayed.

Similar to the user interface 100, the user interface 200 allows the multimedia content icons 206 in each collection to be scrolled to display additional multimedia content icons 206 at least in response to identification of a hand gesture. In some embodiments, the hand gesture can be received via a touchscreen display of the computing device. In some embodiments, the hand gesture results in the multimedia content icons 206 and associated keyword tags 208 being scrolled horizontally. In some embodiments, a vertical hand gesture results in a vertical scrolling of the digital asset search page providing for display of additional collections.

Figure 3:
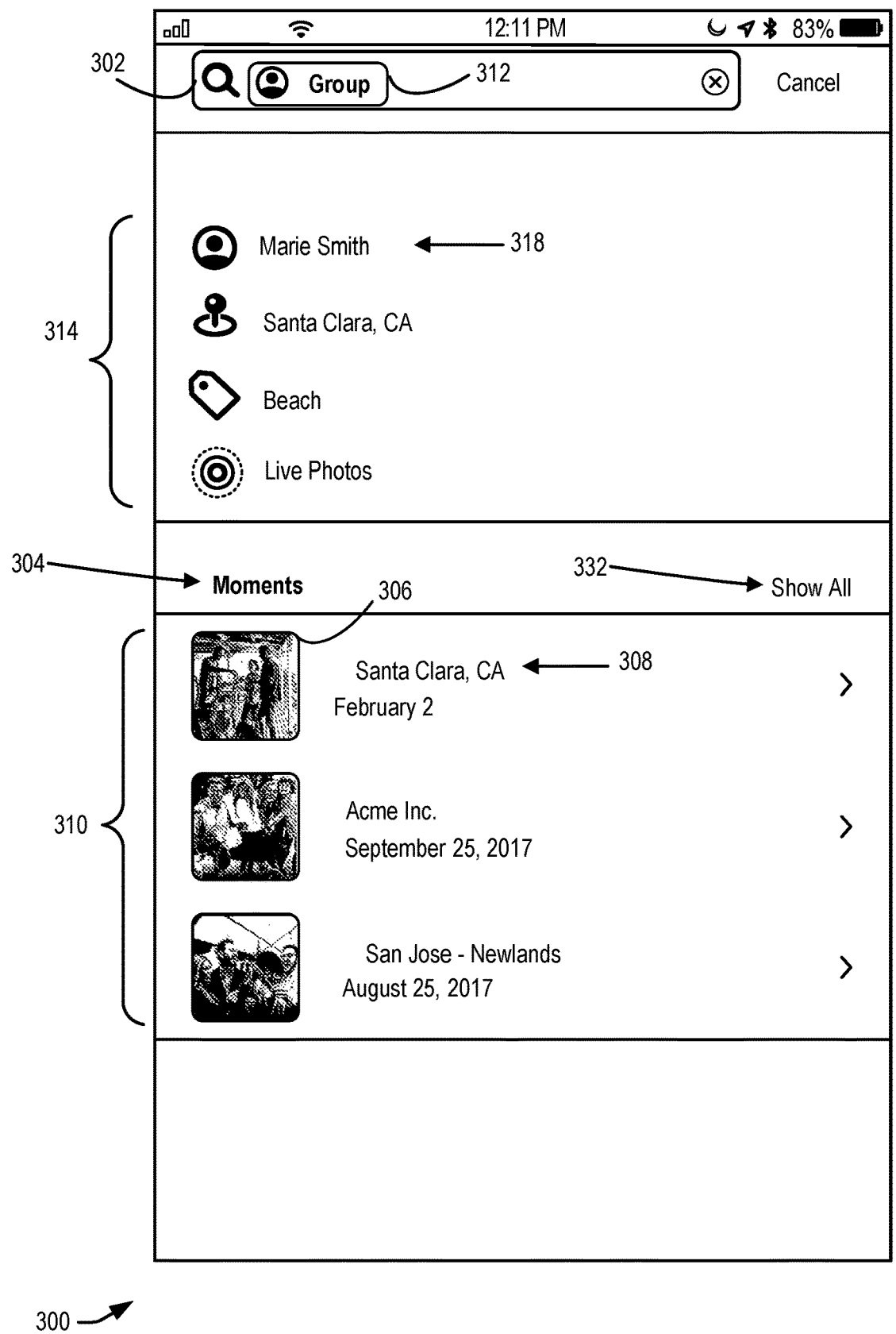
FIG. 3 illustrates another example user interface for digital asset search, specifically a suggestions page, in accordance with at least one embodiment.

FIG. 3 illustrates another example user interface for digital asset search, specifically a suggestions page, in accordance with at least one embodiment. The user interface 300 allows a user to further refine a search of the digital asset collection. Similar to user interface 200 and user interface 300, a search field 302 is depicted in one area of the display. Upon selection of one of the multimedia content icons 306 the digital asset management module/logic presents one or more additional search categories 314 that can be selected to further refine the search of the digital assets. For example, in user interface 300 a Group multimedia content icon was selected as the primary search category 312 resulting in the Group icon being depicted in the search field 302. The digital asset search module/logic presents additional suggested search categories 314 that include the names of persons, places, scenes, and Live Photos identified by metadata as being related to the selected group 306. As shown in FIG. 3, a "person" icon can be depicted next to each of the person's name. The Place icon is located next to "Santa Clara, Calif." The scene icon is located next to the "Beach" keyword tag. There is an icon located next to the "Live Photos" icon that indicates there are Live Photos with related metadata. Live Photos records what happens 1.5 seconds before and after a user takes a picture. The names of the persons can be depicted from the metadata of the digital assets or identified through a user's contact list. Selection of any one of these persons would further limit the search of the digital asset collection and return only digital assets that relate to the named person selected. For example, selecting "Marie Smith" would result in only returning digital assets identified as being associated with the person "Marie Smith." The digital asset management module/logic through access of the knowledge graph decides which additional search categories and search category identifiers that are displayed and the order in which they are displayed. Using this feature, a user may be able to search for assets associated with a particular person, even if the user has forgotten the particular person's name but remembers that the person is associated with a Group of individuals.

The user interface 300 depicted in FIG. 3 allows for selection of one or more moments multimedia content icons 306. A moment is a collection of digital assets associated with each other both temporally and geographically. The user interface 300 may depict a plurality of moment multimedia suggestions 310. Each moment multimedia content icon 306 depicts a representative image from the digital assets associated with the moment and a keyword tag 308 identifier that identifies a location and date associated with the digital assets associated with the moment. Selection of any one of these moment multimedia content icons 306 would further limit the search of the digital asset collection and return only digital assets that relate to both the location and temporal limitation associated with the moment. For example, selecting "Santa Clara, Calif. February 2" would result in only returning digital assets identified as being associated with both location metadata associated with "Santa Clara, Calif." and temporal metadata associated with the date "February 2." The digital asset management module/logic through access of the knowledge graph decides which multimedia content icons 306 and associated keyword tags 308 to display and in which order the multimedia content icons 306 and associated keyword tags 308 are displayed. Further, the digital asset management module/logic through access of the knowledge graph decides the range of temporal metadata to include for a specific moment and the range of location metadata for identifying the location of the moment. Additional moments can be displayed by selecting the "Show All" option 332. Additional information on the generation of moments can be found in U.S. patent application Ser. No. 15/391,276, filed Dec. 27, 2016, entitled "Knowledge Graph Metadata Network Based on Notable Moments," which is incorporated by reference in its entirety and for all purposes.

Figure 4:
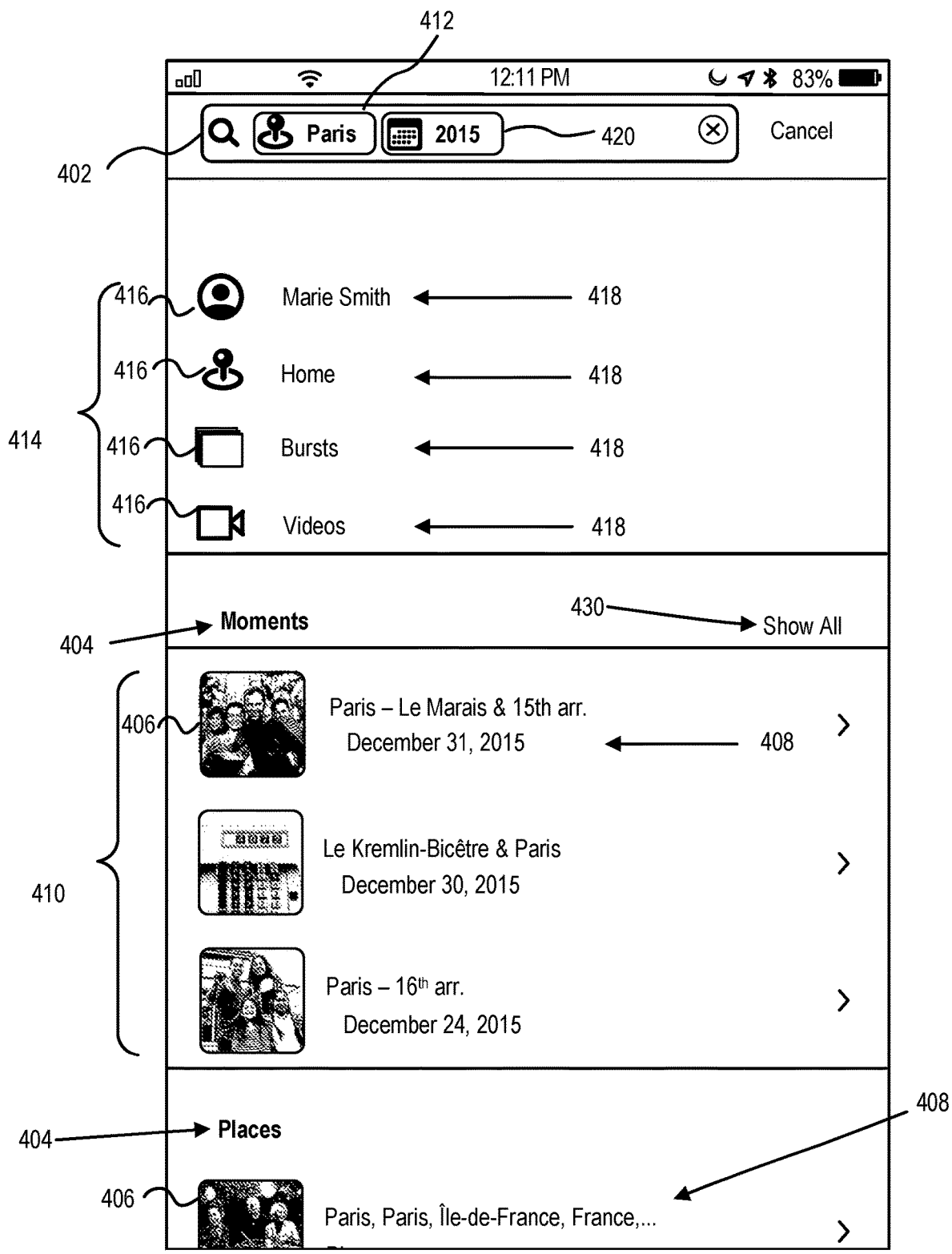
FIG. 4 illustrates another example user interface for digital asset search, specifically another example of a suggestions page, in accordance with at least one embodiment.

FIG. 4 illustrates another example user interface for digital asset search, specifically another example of a suggestions page, in accordance with at least one embodiment. The user interface 400 allows a user to further refine a search of the digital asset collection. Similar to user interface 100, 200, and 300, a search field 402 is depicted in one area of the display. Upon selection of one of the multimedia content icons 406, the digital asset management module/logic presents one or more additional search categories 414 that can be selected to further refine the search. For example, in user interface 400, a Place (here, "Paris"), primary search term 412, and Date (here, "2015"), secondary search term 420, are selected and depicted in the search field 402. As shown, both the Place and Date search terms can have an associated icon. Selection of these primary and secondary search terms further refines the search of the digital assets in the digital asset collection to limit the return of digital assets with metadata associated with both "Paris" and "2015." The digital asset search module/logic further suggests additional search terms 414 to further refine the search. The additional search term icons 416 and associated search terms 418 include the name "Marie Smith," "Home," "Bursts," and "Videos." Selections of any of these additional search icons 416 or search terms 418 will further limit the display of digital assets with metadata having characteristics associated with the selected term. For example, selection of the "Marie Smith" icon will result in further filtering of the digital asset collection to only display digital assets with metadata associated with "Paris," "2015," and "Marie Smith."

Similar to the user interface 300, the user interface 400 depicted in FIG. 4 allows for selection of one or more moments multimedia content icons. A moment is a collection of digital assets associated with each other both temporally and geographically. A plurality of moment multimedia content icons 410. Each moment multimedia content icon 406 depicts a representative image from the digital assets associated with the moment and a keyword tag 408 identifier that identifies a location and date associated with the digital assets associated with the moment. Selection of any one of these moment multimedia content icons 406 would further limit the search of the digital asset collection and return only digital assets that relate to both the location and temporal limitation associated with the moment. For example, selecting "Paris—Le Marais & 15th Anniversary" would result in only returning digital assets identified as being associated with both location metadata associated with "Paris" and temporal metadata associated with the date "Dec. 15, 2015." The digital asset management module/logic through access of the knowledge graph decides which multimedia content icons 406 and associated keyword tags 408 to display and in which order the multimedia content icons 406 and associated keyword tags 408 are displayed. Further, the digital asset management module/logic through access of the knowledge graph decides the range of temporal metadata to include for a specific moment and the range of location metadata for identifying the location of the moment. Additional moments can be displayed by selecting the "Show All" option 432.

The user interface 400 depicted in FIG. 4 also allows further sorting of results by additional categories. The number and types of additional categories is determined by the digital asset search module/logic and depends on the metadata associated with the digital assets stored in the digital asset collection. In an example, as show in FIG. 4, the digital assets can be further filtered by Dates or Places. For example, digital asset search module/logic presents additional multimedia content icons 406 and keyword tags 408 with for additional search categories for selection by a user. In this example, the digital asset management module/logic through access of the knowledge graph decides the individual dates and specific locations to include for this category.

Figure 5:
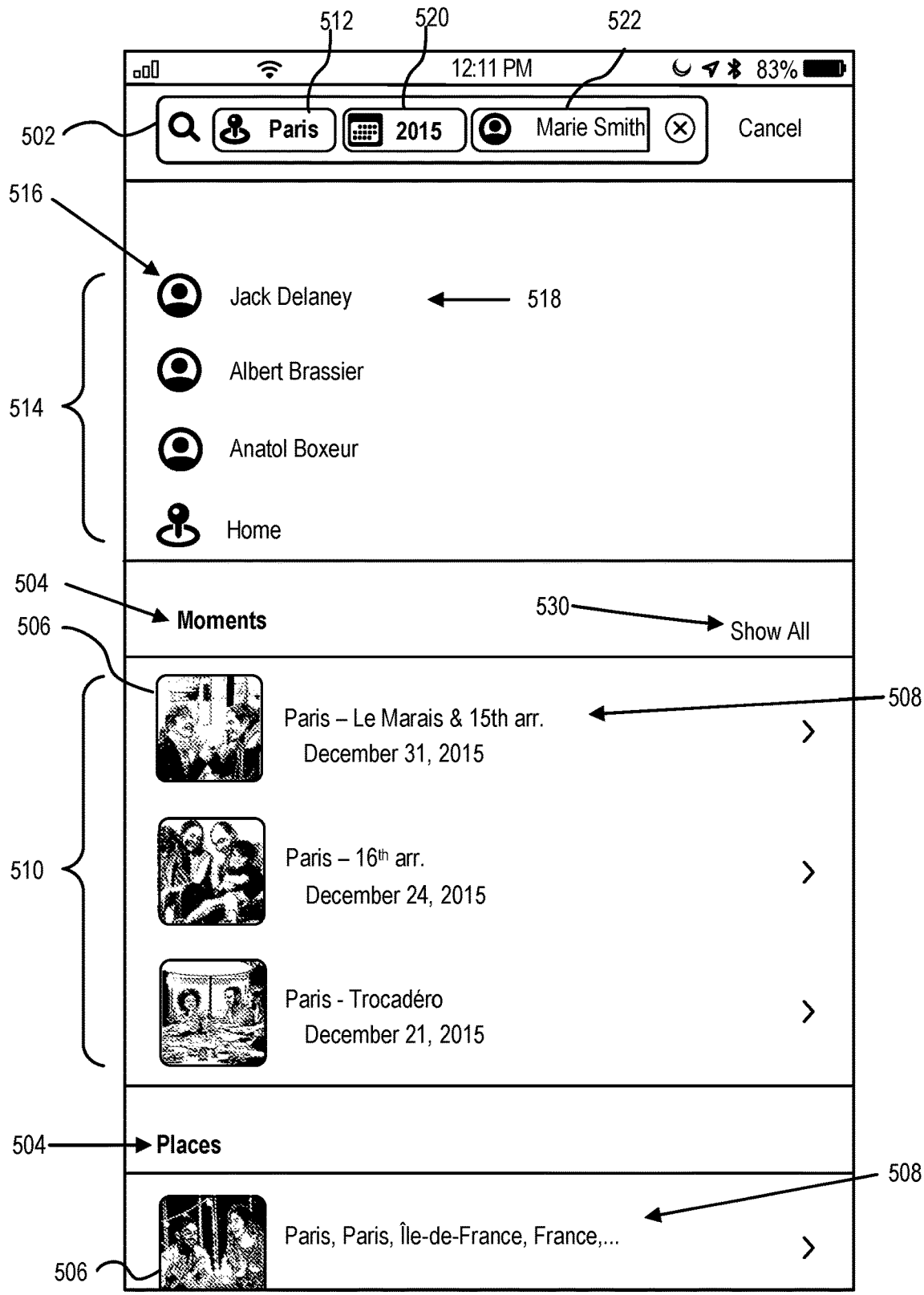
FIG. 5 illustrates another example user interface for digital asset search, specifically another example of a suggestions page, in accordance with at least one embodiment.

FIG. 5 illustrates another example user interface for digital asset search, specifically another example of a suggestions page, in accordance with at least one embodiment. The user interface 500 allows a user to further refine a search of the digital asset collection. Similar to user interfaces 100, 200, 300, and 400, a search field 502 is depicted in an area of the display. Upon selection of one of the multimedia content icons 506 the digital asset management module/logic presents one or more additional search categories 514 that can be selected to further refine the search. For example, in user interface 500, a Place (here, "Paris") has been selected as the primary search term 512, a Date (here, "2015") has been selected as a secondary search term 520, and a person (here, "Marie Smith") has been selected as a tertiary search term 522. These terms are displayed in the search field 502. Each of the search terms are depicted with an associated icon. Selection of these primary, secondary search, and tertiary terms further refine the search of the digital assets in the digital asset collection to limit the return of digital assets with metadata associated with "Paris," "2015," and "Marie Smith." The digital asset search module/logic further suggests further additional search terms 514 to further refine the search. The additional search term icons 516 and associated search terms 518 include the names "Jack Delaney," "Albert Brassier," "Anatol Boxeur" and Place "Home." Selections of any of these additional search icons 516 or search terms 518 will further limit the display of digital assets with metadata having characteristics associated with the selected term. For example, selection of the "Jack Delaney" icon will result in further filtering of the digital asset collection to only display digital assets with metadata associated with "Paris," "2015," "Marie Smith," and "Jack Delaney."

User interface 500 also presents moments and additional suggested search categories that function similar to the moments and additional search categories described for user interface 400. In an example, in FIG. 5, the additional search categories for the search are "Dates," "People," and "Places." Scrolling the user interface page 500 down can present additional multimedia content icons 506 and associated keyword tags 508.

Figure 6:
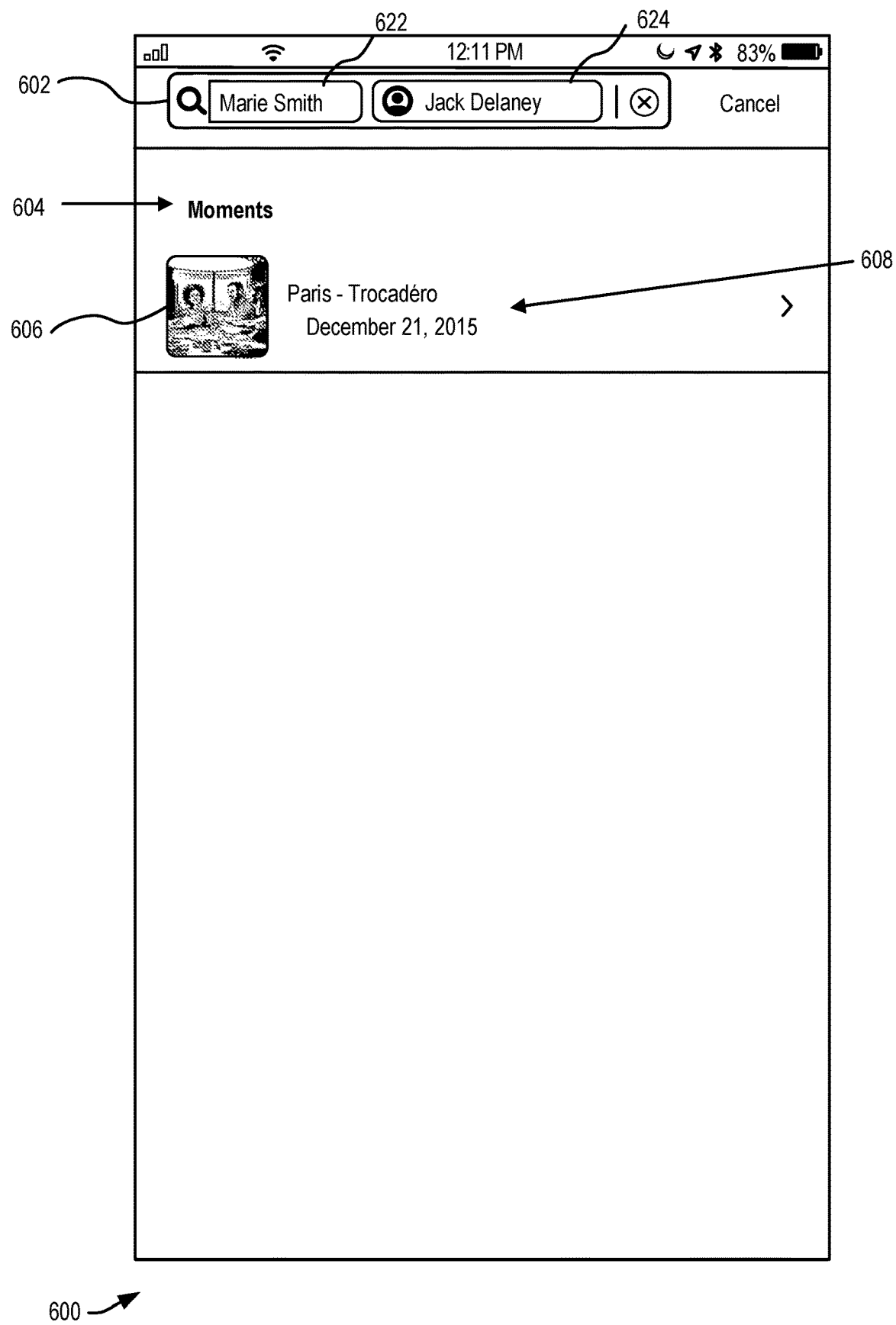
FIG. 6 illustrates another example user interface for digital asset search, specifically an example results page, in accordance with at least one embodiment.

FIG. 6 illustrates another example user interface for digital asset search, specifically an example results page, in accordance with at least one embodiment. The user interface 600 allows a user to further refine a search of the digital asset collection. Similar to user interfaces 100, 200, 300, 400, and 500, a search field 602 is depicted in one area of the display. Exemplary user interface 600 presents the results from user interface 600 when "Jack Delaney" was selected as additional search term 624. Here, the user interface only suggests moments with metadata associated with "Paris," "2015," "Marie Smith," and "Jack Delaney." This demonstrates how the selection of numerous search categories can narrow the search, possibly to a single moment, making it easier for users to find specific digital assets within the collection with a few keystrokes. The exemplary user interface 600 depicts only a single moment identified with keyword tag 608 "Paris—Trocadero, Dec. 21, 2015" with associated multimedia content icon 606. Selection of the moment multimedia content icon 606 will return the digital assets associated with that moment.

Figure 7:
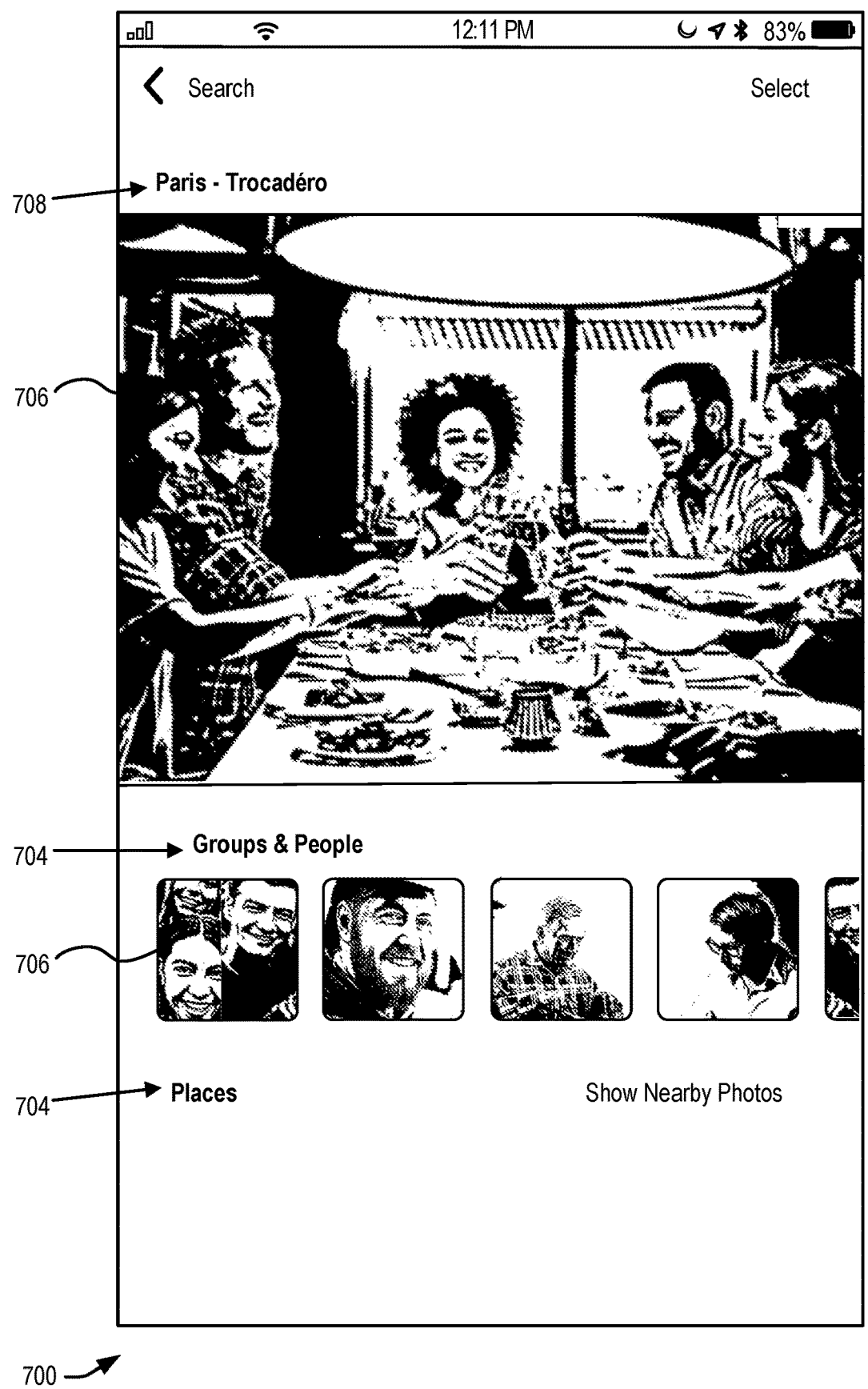
FIG. 7 illustrates another example user interface for digital asset search, specifically another example results page, in accordance with at least one embodiment.

FIG. 7 illustrates another example user interface for digital asset search, specifically another example results page, in accordance with at least one embodiment. User interface 700 depicts the moment with multimedia content icon 706 and keyword tag 708 for "Paris-Trocadero" from the search described for FIG. 6. As depicted in FIG. 7, related searches can be conducted by selecting one of the multimedia content icon 706 for the collections for Groups and People. This allows for additional searching to be conducted for digital assets related to the selected moment. For example, the "Show Nearby Photos" allows the digital asset search module/logic to search digital assets with metadata stored on neighboring nodes.

Figure 8:
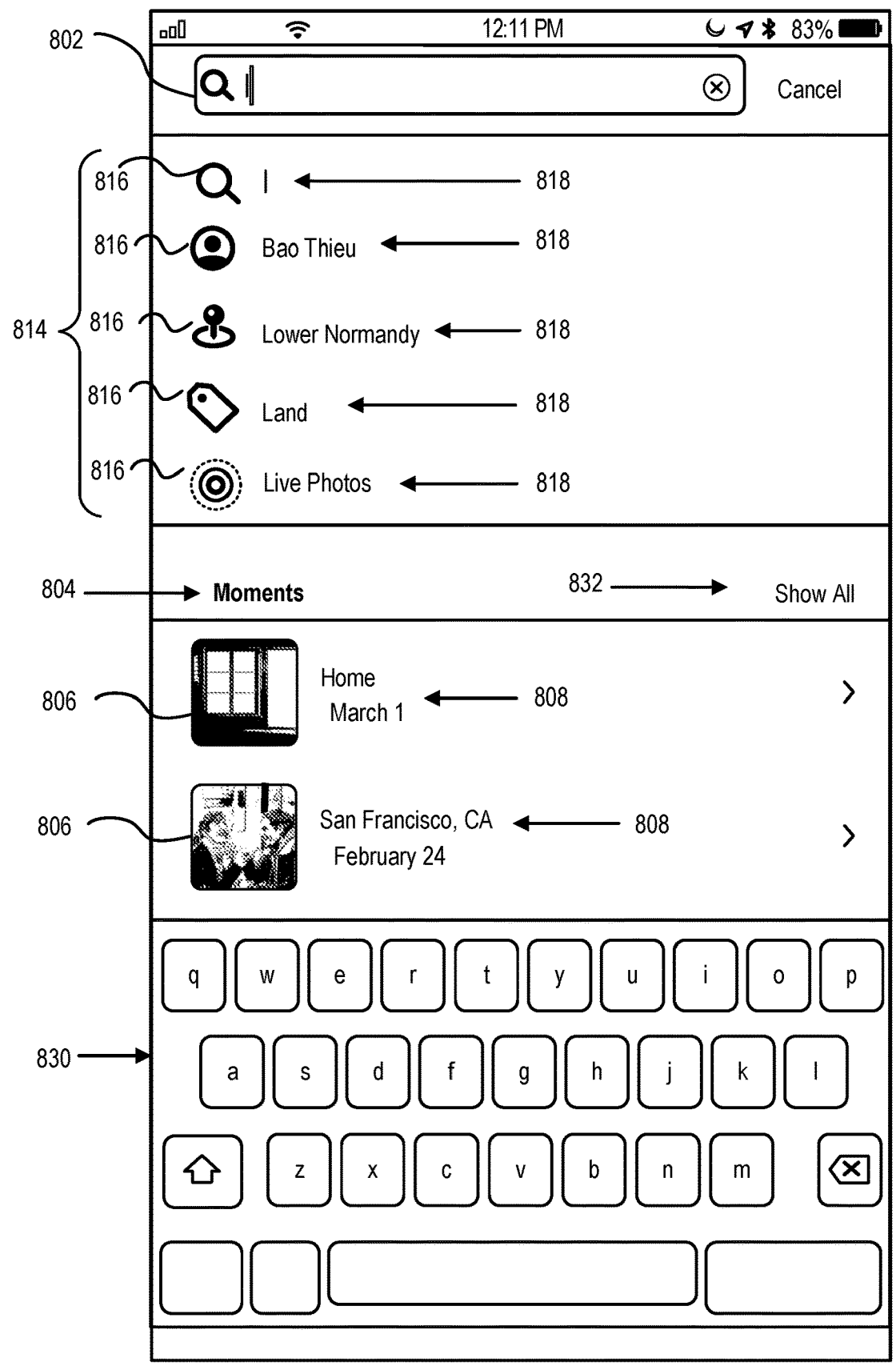
FIG. 8 illustrates another example user interface for digital asset search, specifically an example of auto completion, in accordance with at least one embodiment.

FIG. 8 illustrates another example user interface for digital asset search, specifically an example of auto completion, in accordance with at least one embodiment. The user interface 800 allows a user to further refine a search of the digital asset collection. Similar to the other user interfaces disclosed herein, a search field 802 is depicted in a first area of the display. User interface 800 illustrates the next keyword suggestion feature. As shown in FIG. 8, the a string of text (here, the letter "1") is entered into the search field 802. The digital asset search module/logic returns suggested search categories 814 with associated collections icons 816 and keyword tags 818 to help in suggesting a further search category. User interface 800 also presents moments that functions similar to the moments and additional search categories described for user interface 400. For example, multimedia content icons 806 and associated keyword tags 808 can be depicted in user interface 800. FIG. 8 also illustrates a virtual keyboard 830 for use in entering text into the search field. The virtual keyboard 830 can be displayed by entering selected the search field without first selecting a multimedia content icon 806. Additional moments can be displayed by selecting the "Show All" option 832.

Figure 9:
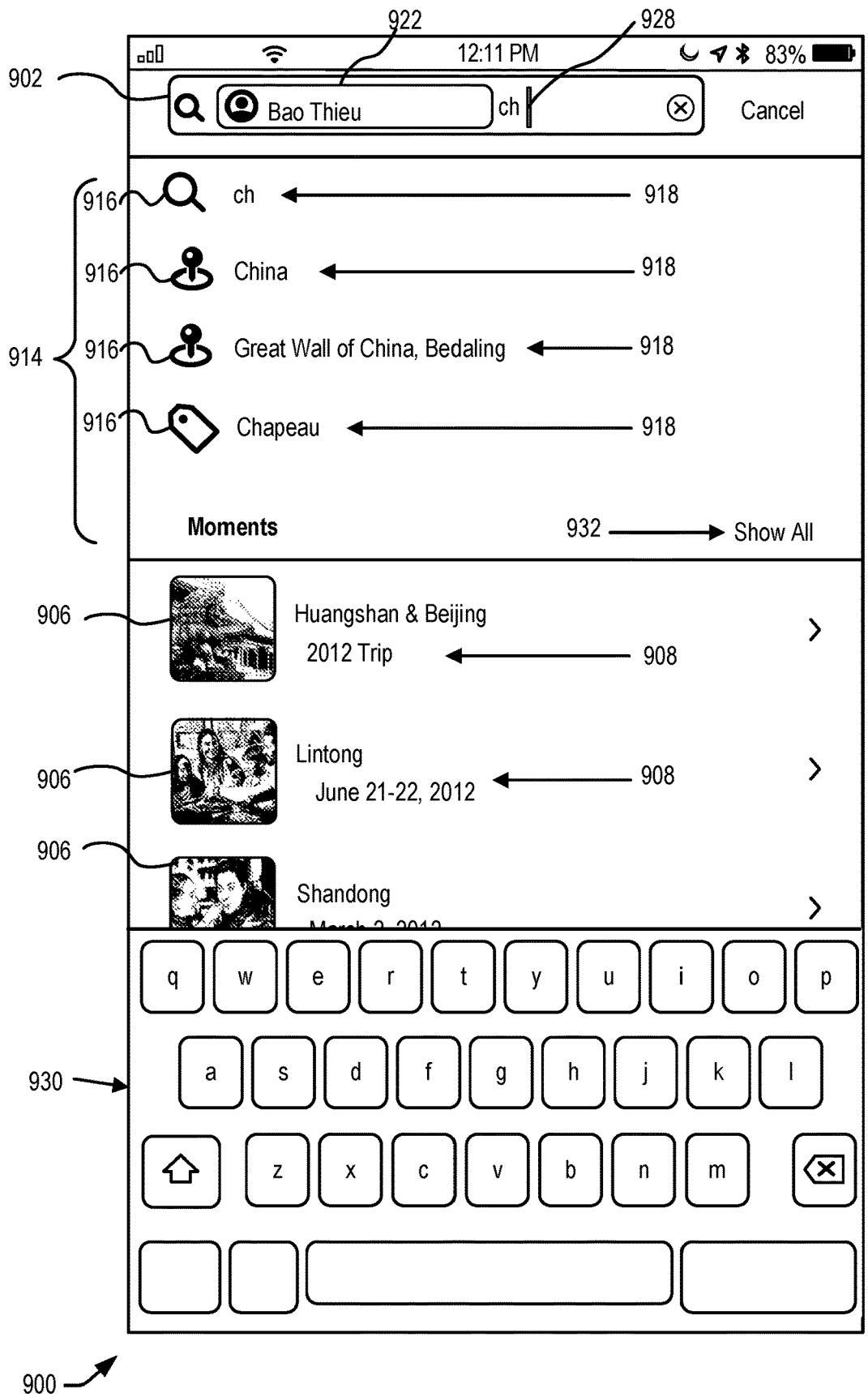
FIG. 9 illustrates another example user interface for digital asset search, specifically another example of next keyword suggestion, in accordance with at least one embodiment.

FIG. 9 illustrates another example user interface for digital asset search, specifically another example of the next keyword suggestion feature, in accordance with at least one embodiment. The user interface 900 allows a user to further refine a search of the digital asset collection by entering text after selection of one or more search categories 922. Similar to the other disclosed user interfaces herein, a search field 902 is depicted in an area of the display. User interface 900 further illustrates the next keyword suggestion feature. As shown in FIG. 9, the a string of text (here, the letter "ch") is entered into the search field 902 following the People "Bao Thieu" search category. The digital asset search module/logic returns suggested search categories 914 with associated collections icons 916 and keyword tags 918 to help in suggesting a further search category. User interface 900 also presents moments that functions similar to the moments and additional search categories described for user interface 800. For example, user interface 900 displays moment additional content icons 906 and associated keyword tags 906. FIG. 9 also illustrates a virtual keyboard 930 for use in entering text into the search field. Additional moments can be displayed by selecting the "Show All" option 932.

Figure 10:
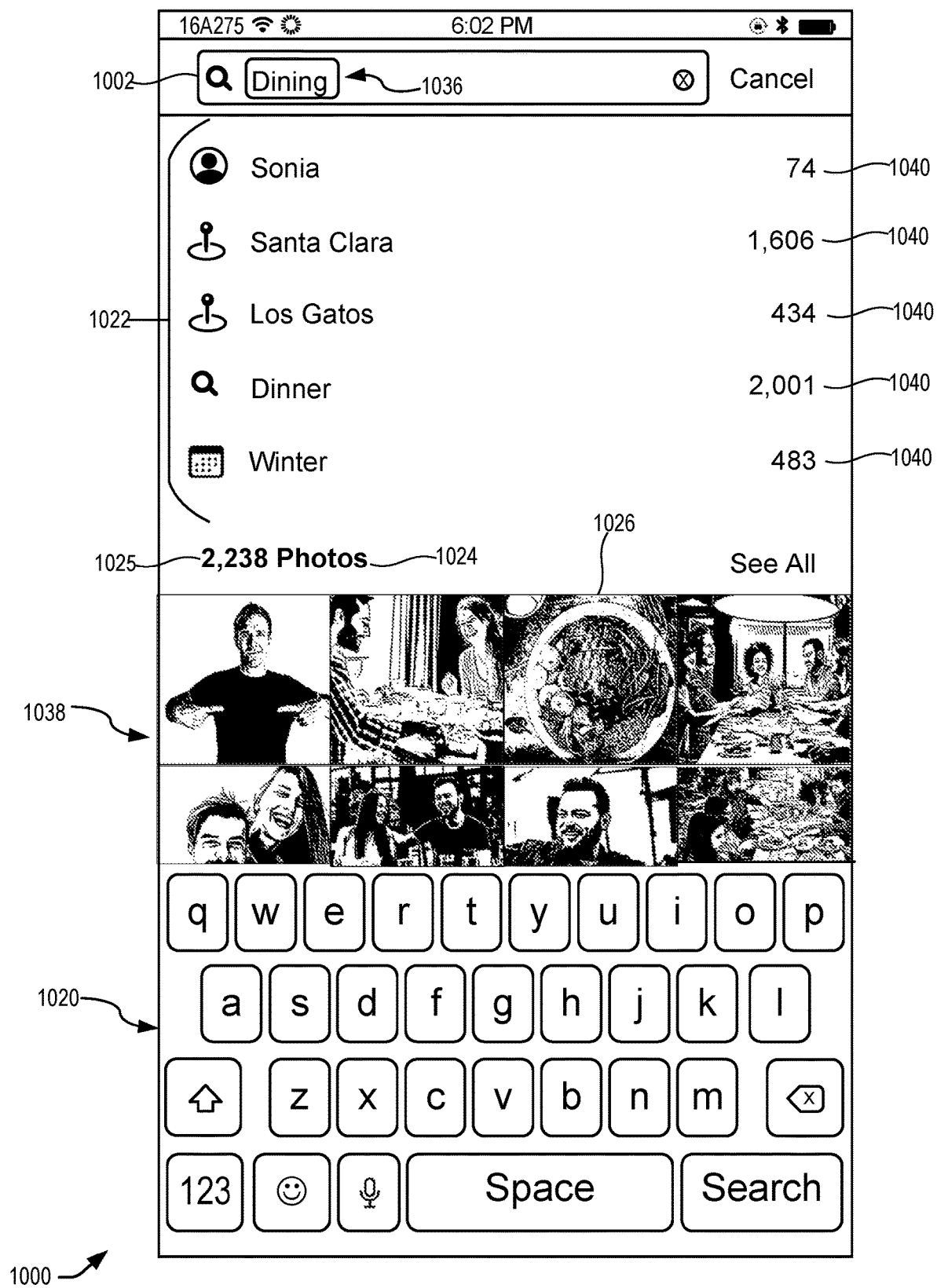
FIG. 10 illustrates another example user interface for digital asset search, specifically a suggestions page, in accordance with at least one embodiment.

FIG. 10 illustrates another example user interface for digital asset search, specifically a suggestions page, in accordance with at least one embodiment. The user interface 1000 allows a user to further refine a search of the digital asset collection. Similar to user interfaces 300 and 400, a search field 1002 is depicted in one area of the display. Upon selecting a category 1036 such as "Dining" into the search field 1002, the digital asset search techniques will suggest possible search terms to return digital assets responsive to the category 1036. Suggested search terms 1022 provide the user the ability to further refine the search based on metadata for the suggested search terms 1022. In FIG. 10, the suggested search terms 1022 include: the People icon and "Sonia." The suggestion count 1040 indicates that there are 74 digital assets with metadata associated with "Dining" and "Sonia." Selecting the "Sonia" search term will return digital assets associated with "Dining" and "Sonia."

In FIG. 10, the example user interface 1000 suggests the following: the locations "Santa Clara" with 1,606 digital assets and "Los Gatos," with 434 digital assets; the search term "Dinner," with 2,001 digital assets; and the calendar for "Winter," with 483 digital assets. The Photos identifier 1024 lists the type of digital assets with metadata associated with the search term entry 1018. The Photos identifier 1024 lists the type of digital assets with metadata associated with the category 1036 of "Dining." The asset count number 1025 indicates the number of digital assets for the Photo identifier 1024. In the example in FIG. 10, there are 2,238 photos responsive to the category 1036 of "Dining." One exemplary digital asset 1026 is a digital photo of a meal. FIG. 10 also depicts exemplary digital asset thumbnails in two rows underneath the Photos identifier 1024. Underneath the exemplary digital asset thumbnails is a virtual keyboard 1020 for entry of the text into the search field 1002.

In some embodiments, the Top 8 feature can display the thumbnails 1038 for the top digital assets that are responsive to the search query. In various embodiments, the Top 8 thumbnail results are displayed in two rows of four thumbnails each. In some embodiments, the digital assets can first be sorted into chronological order. In some embodiments, the chronological order can be from the oldest asset, based on the asset creation date, to newest asset, based on the asset creation date. In some embodiments, the chronological order can be reversed. In some embodiments, a digital asset management module/logic can access the knowledge graph for the digital assets to sort the digital assets into clusters. If the number of digital assets is less than a set amount (e.g., 160 assets), the assets can be indexed into a distinct number of groups with an equal number of assets each. For example, for a Top 8 presentation with 160 digital assets, the digital asset management module/logic can index the digital assets into eight groups with 20 digital assets each. In another example, for a Top 8 presentation and 80 assets, digital asset management module/logic can index the digital assets into eight groups with 10 assets each. If the number of digital assets is greater than a set amount (e.g., 160 assets), the assets can be sampled with a number of clusters of digital assets to reduce the runtime. For example, if there are 1,200 digital assets responsive to the search request, the digital asset management module/logic can look for the top 8 clusters of assets and divide the top 8 clusters into eight groups with 20 digital assets each. Therefore, the larger the number of digital assets, the greater the number of digital assets that will not be sampled for Top 8 results. If there are less than the set number of digital assets (e.g., 160 digital assets), the techniques sample all the digital assets.

The digital asset management/logic can use the knowledge graph to determine if there is sufficient time distance between the digital assets. For example, the search results should not return multiple assets from the same cluster or event. This presents some diversity in the display of thumbnails for the digital assets.

In some embodiments, a set number of assets (e.g., 20 assets) from each index location can be sampled. The digital asset management/logic can access a content score for each of the sampled assets from the knowledge graph. In some embodiments, the content score can be calculated using empirical rules and thresholds. For example, based on the rules the techniques can select a range of possible scores including: [0.00; 0.25] for junk digital assets, screenshots, documents, blurry assets, assets with very low aesthetic scores, and videos that are very short (e.g., only a few seconds); [0.60; 0.75] for assets that are edited, assets that are frequently viewed or played, or assets that are standout as panorama or portraits; [0.75; 1.00] for digital assets that are marked as favorites, have excellent aesthetic scores, have been frequently shared, have many people identified in the digital assets; [0.50; 075] for all remaining digital assets. Once a score is assigned to a digital asset, an exact score can be computed within the assigned ranges based on the number of people in the digital asset, the faces in the digital asset, smiles in the digital asset, blinks in the digital asset, the number of shares for a digital asset, and the type of digital asset (e.g., photos, videos, screenshot, LivePhotos, Burst, Panorama, Portrait, Selfies, Long Exposure, Screen Shot, Animated, SloMo, etc.). The top scoring assets from each asset sampling can be used to display within the Top 8 assets.

The digital asset with the highest content score in each indexed group can be selected as one of the Top 8 thumbnails for display. In various embodiments, if there is a tie between two or more digital assets for the indexed group the digital asset management/logic can access an aesthetic score for each of the digital assets as a tiebreaker for selection of one of the Top 8 digital assets. In some embodiments, the aesthetic score can be calculated by assigning weights to a number of properties for digital assets. The aesthetic score can be computed using a deep neural network. In various embodiments, the techniques curate a dataset and then train a model. The technique can first create a dataset of pictures, unrelated to a the digital assets on a user's device. The techniques can train the model by asking human annotators to rate the picture (e.g., on a scale from 1 through 5) on the global aesthetics of the picture, and photographic attributes such as framing, focus, lighting, composition, timing, blur etc. In various embodiments, there can be a total of 20 such attributes. Subsequently, a neural network can be trained to predict these attribute scores for other digital assets. The training process can take an image as input and predict the final aesthetic score based on the training. The formula can be abstracted by the deep learning model that maps an image through multiple non-linear transformations to the predicted aesthetics scores. Inference of this model on various device can be accomplished through web editing applications (e.g., Espresso) for on device inferences.

In some embodiments, the search results can include a suggestion count 1040. The suggestion count can be determined by counting the digital assets or that can be responsive to the search results. The suggestion count can include multiple types of digital assets (e.g., photos, videos, panoramas etc.) in the suggestion count. In some embodiments, the suggestion count can be displayed to the right of the suggested search category on the display and include the number of digital assets. In some embodiments, the digital asset management/logic can de-duplicate digital assets when multiple suggestions are folded together to ensure the suggestion count can be representative of the number of results the user will see after selecting the search term.

Figure 11:
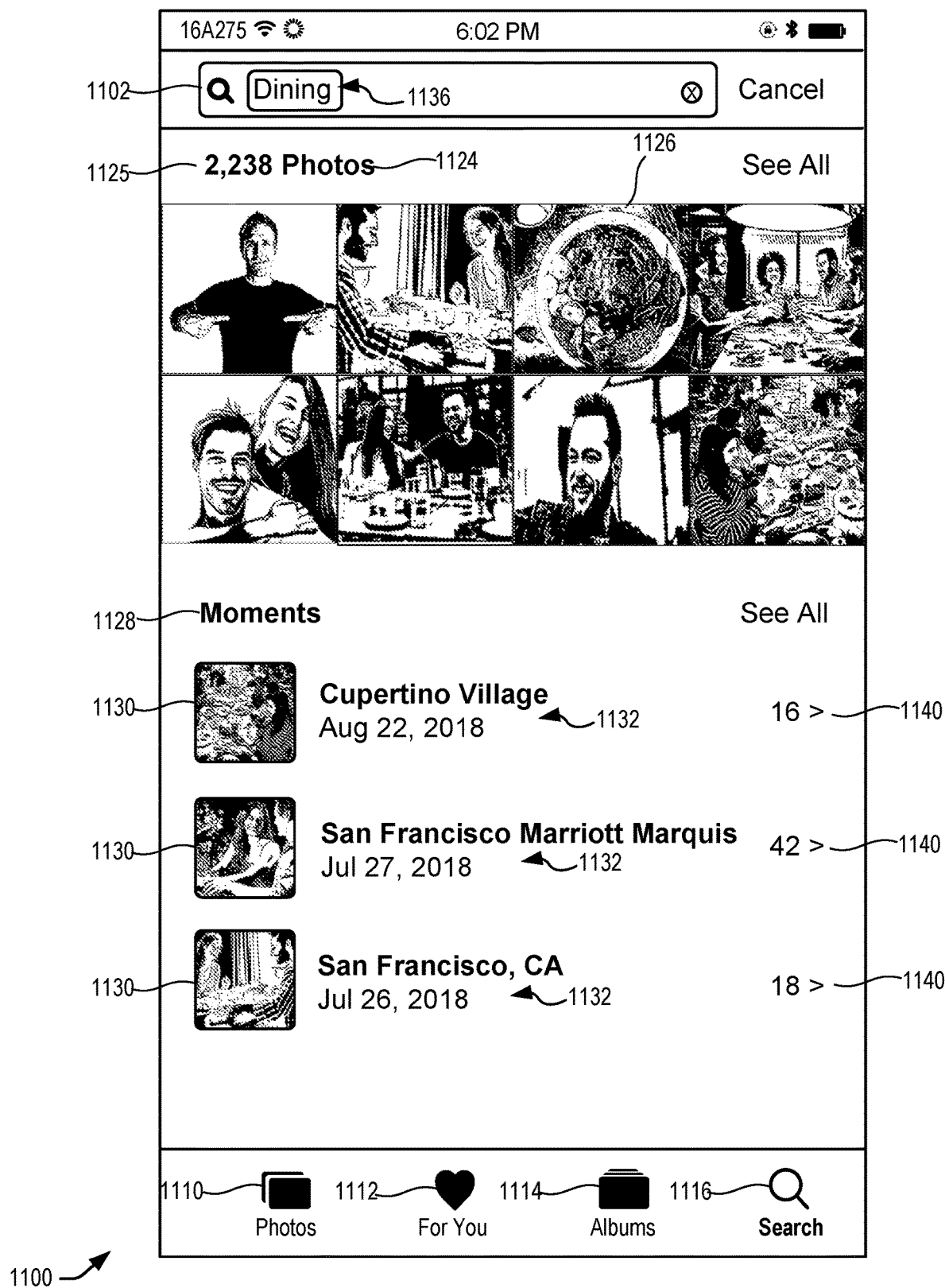
FIG. 11 illustrates another example user interface for digital asset search, specifically a results page, in accordance with at least one embodiment.

FIG. 11 illustrates example user interface for digital asset search, specifically a continuation of the user interface of FIG. 10. Scrolling downward using a hand gesture on the touch screen display of the electronic device on the user interface 1100 presents an additional user interface 1100. In addition to depicting the search field 1102 in an area of the display, the exemplary digital asset thumbnails in two rows underneath the Photos identifier 1124, the user interface 1100 presents Moments indicator 1128. Upon selecting a category 1136 such as "Dining" into the search field 1102, the digital asset search techniques will displays moments responsive to the category 1136. A moment is a collection of digital assets associated with each other both temporally and geographically. A plurality of moment multimedia content icons 1130 are also depicted in user interface 1100. Each moment multimedia content icon 1130 depicts a representative image from the digital assets associated with the moment and a keyword tag 1132 identifier that identifies a location and date associated with the digital assets associated with the moment. Selection of any one of these moment multimedia content icons 1130 would further limit the search of the digital asset collection and return only digital assets that relate to both the location and temporal limitation associated with the moment. For example, selecting the moment content icon 1130 for "Cupertino Village" would return digital assets with metadata associated a moment for Cupertino Village captured on Aug. 22, 2018. FIG. 11 presents the additional moments of "San Francisco Marriot Marquis" on Jul. 27, 2018 and "San Francisco" on Jul. 26, 2018. The digital asset management module/logic through access of the knowledge graph decides which multimedia content icons 1130 and associated keyword tags 1132 to display and in which order the multimedia content icons 1130 and associated keyword tags 1132 are displayed. Further, the digital asset management module/logic through access of the knowledge graph decides the range of temporal metadata to include for a specific moment and the range of location metadata for identifying the location of the moment.

The user interface 1100 depicts a plurality of icons allowing for additional organizational tools for management of the digital asset collection. The icons can include an "Photos" icon 1110, a "Favorites" icon (labelled "For You") 1112, an "Albums" icon 1114, and a "Search" icon 1116. As shown in FIG. 11, the "Search" feature is selected. Selecting the "albums" icon will direct the user to an albums feature for the digital assets. Selecting the "Favorites" icon will direct the user to a "Favorites" page. Selecting "Photos" will direct the user to a page which lists digital assets in chronological order.

Figure 12:
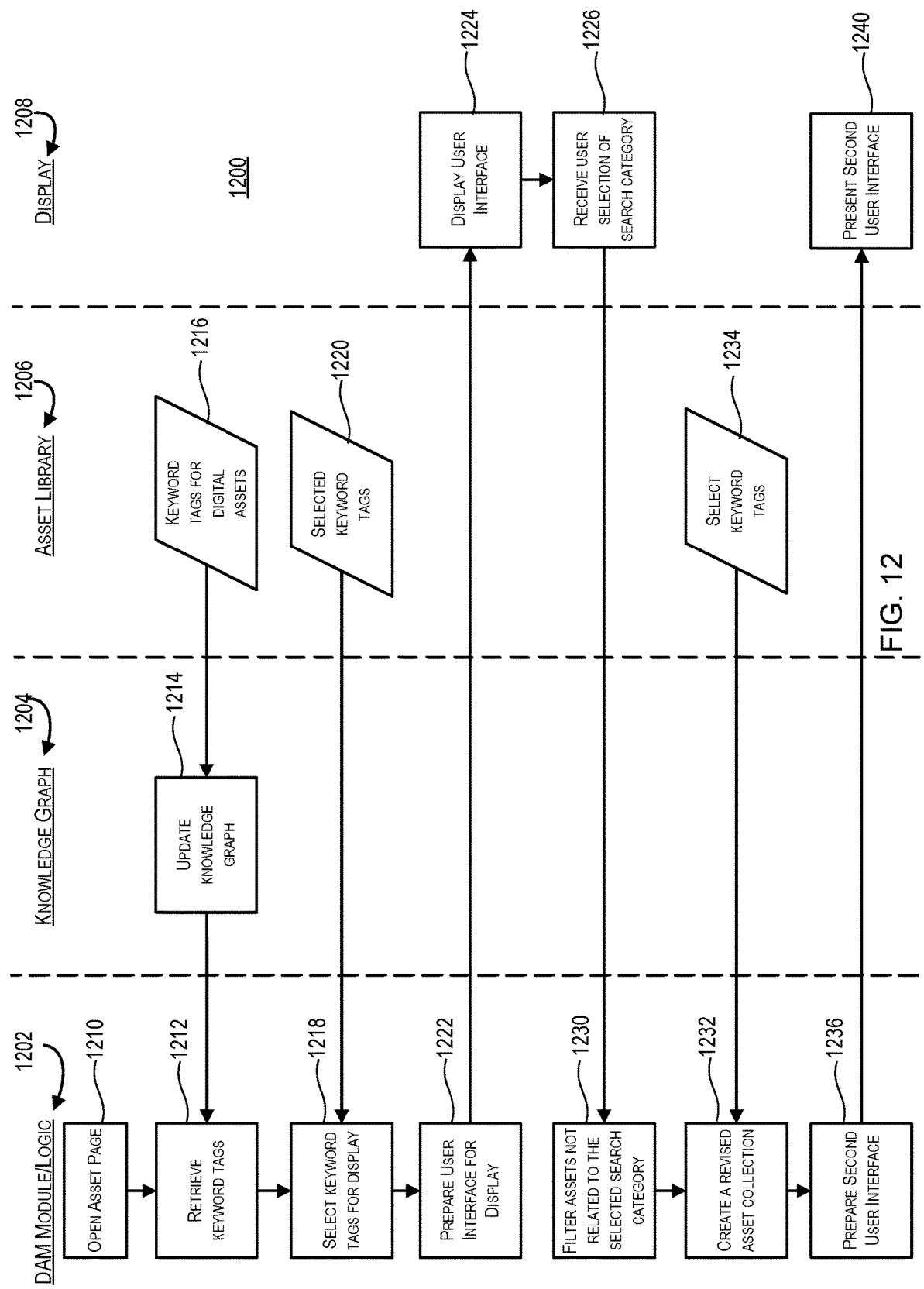
FIG. 12 illustrates an example flow diagram for the technique of searching digital assets in a digital asset collection.

FIG. 12 illustrates an example process flow diagram for searching digital assets in a digital asset collection of a computing device. The search process 1200 illustrates a digital asset search module/logic 1202, a knowledge graph 1204, an asset collection 1206, and a display 1208. The digital asset search module/logic 1202, a knowledge graph 1204, an asset collection 1206, and a display 1208 indicate the elements of the system that perform the processes listed below each heading. The digital asset search module/logic 1202 can be stored in one or more memories and executed by the one or more processors of a computing device. The knowledge graph 1204 is a logical collection of metadata associated with digital assets. The knowledge graph 1204 establishes links and correlations between metadata that can be used to generate keyword tags 1216 for searching the digital assets in the digital asset collection. The display 1208 can be a LCD, OLED, AMOLED, Super AMOLED, TFT, IPS, or TFT-LCD that typically can be found a computing device. The display 1208 may be a touch screen display of a computing device.

Process 1200 is illustrated as logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes Some, any, or all of the process 1200 (or any other processes described herein, or variations and/or combinations thereof) may be performed under the control of one or more computer systems configured with computer-executable instructions and may be implemented as code (e.g., executable instructions, one or more computer programs, or one or more applications) executing collectively on one or more processors. The code may be stored on a computer-readable storage medium, for example, in the form of a computer program including a plurality of instructions executable by one or more processors. The computer-readable storage medium may be non-transitory.

The search process 1200 begins by opening the asset page, at block 1210. The asset page may be opened by selection of an icon on a page of a computing device. The icon may be labeled "photos" or another similarly descriptive term for the digital assets stored in the digital asset collection. Opening the asset page results in displaying a user interface for searching the digital assets. The user interface can be presented on the display of the computing device. Next, the digital asset search module/logic retrieves, at block 1212, the keyword tags associated with the digital assets stored in the digital asset collection. The knowledge graph is updated, at block 1214, to include the keyword tags, at block 1216, for all the digital assets stored in the asset collection 1206. As additional assets are added to the digital asset collection, the knowledge graph can also be updated to include new keyword tags associated with the new digital assets.

The digital search module/logic selects, at block 1218, a plurality of selected keyword tags 1220 for display. The knowledge graph prioritizes a series of keyword tags based a criteria. The digital asset collection may contain tens of thousands of assets, and each asset may have multiple metadata stored for each asset in the knowledge graph. In order to make a search easier for a user the digital search module/logic selects the best keywords most likely to be searched by the user. The keyword tags can be separated into various collections (sections) relating to searchable dimensions from the digital asset collection. These collections (sections) can include people, location, time, events. Next, the digital asset search module/logic prepares, at block 1222, the user interface for display. The selected keyword tags 1220 are selected from keyword tags 1216 in the asset collection 1206 stored in a memory of the computing device. This step involves selecting the keywords appropriate for the user and generating the associated multimedia content icons/user interface elements for display. The keywords tags selected for display can change as the digital asset collection or user activity on the computing device changes.

At block 1224, the display presents the user interface for searching the digital asset collection. The user interface is generated on the display of the computing device for view by a user. The display is configured to receive, at block 1226, user selection of a search category. The user selection of search category can be made by simply tapping on one of the multimedia content icons/user interface elements displayed. Other means of selecting one of the multimedia content icons/user interface elements may be used through device buttons or other gestures by a user. Upon receipt of the user selection of search category, at block 1226, the knowledge graph 1204 receives, at block 1228, the keyword tags associated with the selected search category. The digital asset search module/logic uses the selected search category to identify metadata that correlates to assets in the digital asset collection. This metadata can be used to find digital assets or can be used to further generate suggested search terms to further limit the search of the digital assets. The digital asset search module/logic filters, at block 1230, the digital assets not related to the selected search category. The digital asset search module/logic creates, at block 1232, a revised asset collection. The revised asset collection, at block 1232, comprises select keyword tags 1234 from the asset collection 1206. The select keyword tags 1234 correlate to the selected category from block 1226. Next, the digital asset search module/logic prepares, at block 1236, a second user interface. The second user interface can present further search suggestions on the display to allow a user to further refine the search of the digital assets. The second user interface can one or more moments that correspond to the selected search category. The moments correspond to a category of assets that correspond to the same geography location and timeframe. The second user interface can display the images from the search term. At block 1240, the display 1208 presents the second user interface.

Figure 13:
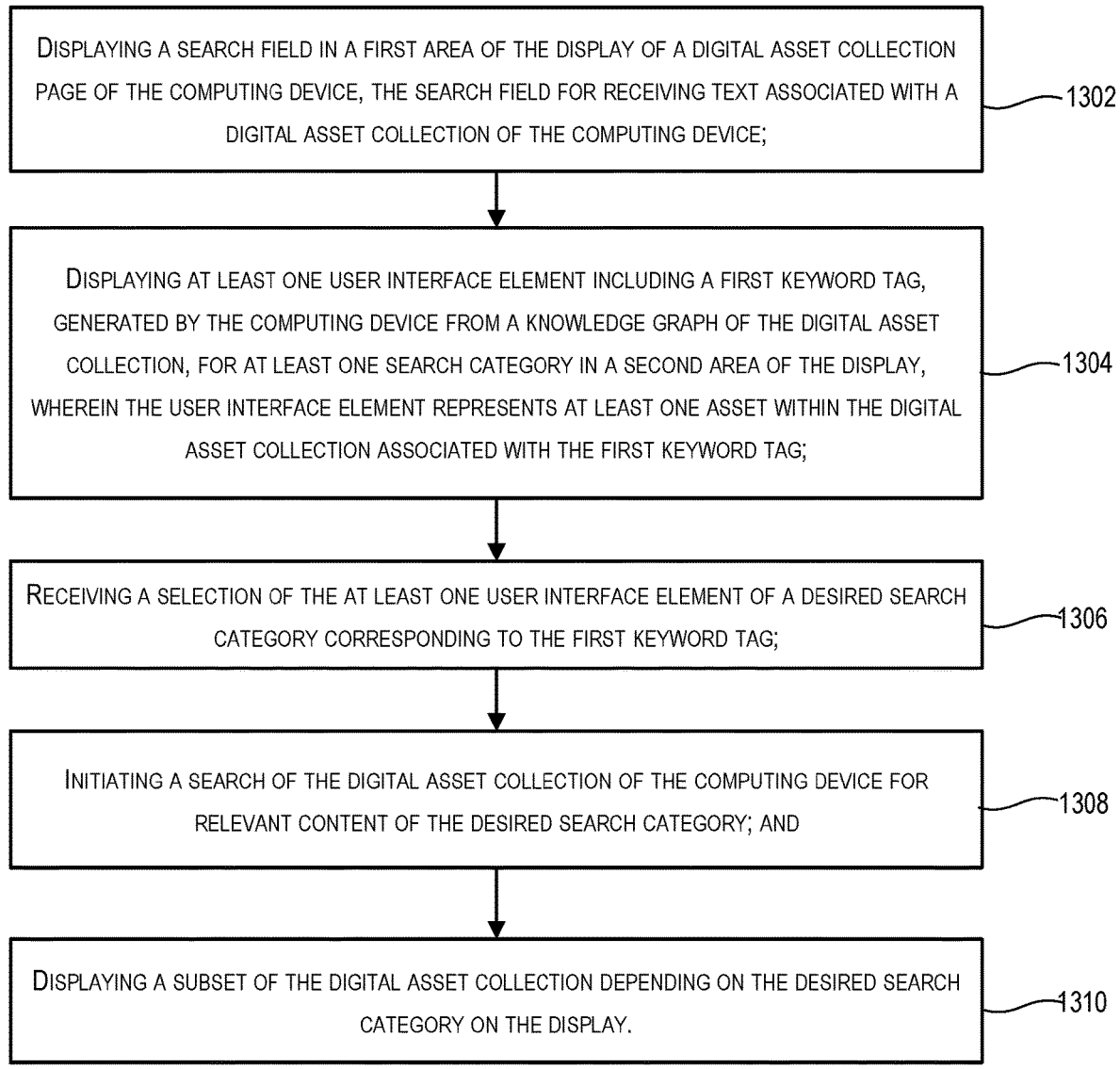
FIG. 13 is a flow diagram to illustrate providing a user interface for searching digital assets in a digital asset collection as described herein, according to at least one example.

FIG. 13 is a flow diagram to illustrate a process 1300 for searching digital asset collections as described herein, according to at least one example. Process 1300 is illustrated as logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes Some, any, or all of the process 1300 (or any other processes described herein, or variations and/or combinations thereof) may be performed under the control of one or more computer systems configured with computer-executable instructions and may be implemented as code (e.g., executable instructions, one or more computer programs, or one or more applications) executing collectively on one or more processors. The code may be stored on a computer-readable storage medium, for example, in the form of a computer program including a plurality of instructions executable by one or more processors. The computer-readable storage medium may be non-transitory.

At 1302, the process 1300 includes displaying a search field in a first area of the display of a digital asset collection page of the computing device, the search field for receiving text associated with a digital asset collection of the computing device.

At 1304, the process 1300 includes displaying at least one user interface element including a first keyword tag, generated by the computing device from a knowledge graph of the digital asset collection, for at least one search category in a second area of the display, wherein the user interface element represents at least one asset within the digital asset collection associated with the first keyword tag.

At 1306, the process 1300 includes receiving a selection of the at least one user interface element of a desired search category corresponding to the first keyword tag.

At 1308, the process 1300 includes initiating a search of the digital asset collection of the computing device for relevant content of the desired search category.

At 1310, the process 1300 includes displaying a subset of the digital asset collection depending on the desired search category on the display.

FIG. 14 illustrates an example flow diagram showing a process (e.g., a computer-implemented technique) 1400 for implementing the digital asset search according to at least a few embodiments. Process 1400 is illustrated as logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes Some, any, or all of the process 1400 (or any other processes described herein, or variations and/or combinations thereof) may be performed under the control of one or more computer systems configured with computer-executable instructions and may be implemented as code (e.g., executable instructions, one or more computer programs, or one or more applications) executing collectively on one or more processors. The code may be stored on a computer-readable storage medium, for example, in the form of a computer program including a plurality of instructions executable by one or more processors. The computer-readable storage medium may be non-transitory.

At 1402, the operations include generating a graphical user interface for searching a digital asset collection on the computing device.

At 1404, the operations include providing a search field in a first area of the graphical user interface, the search field for receiving text associated with the digital asset collection of the computing device; and At 1406, the operations include providing at least one user interface element including a first keyword tag for at least one search category in a second area of the display, wherein the at least one user interface element is generated by the computing device from a knowledge graph of the digital asset collection, and a search of the digital asset collection of the computing device for relevant content of a desired search category is initiated by activating a desired user interface element.

Figure 15:
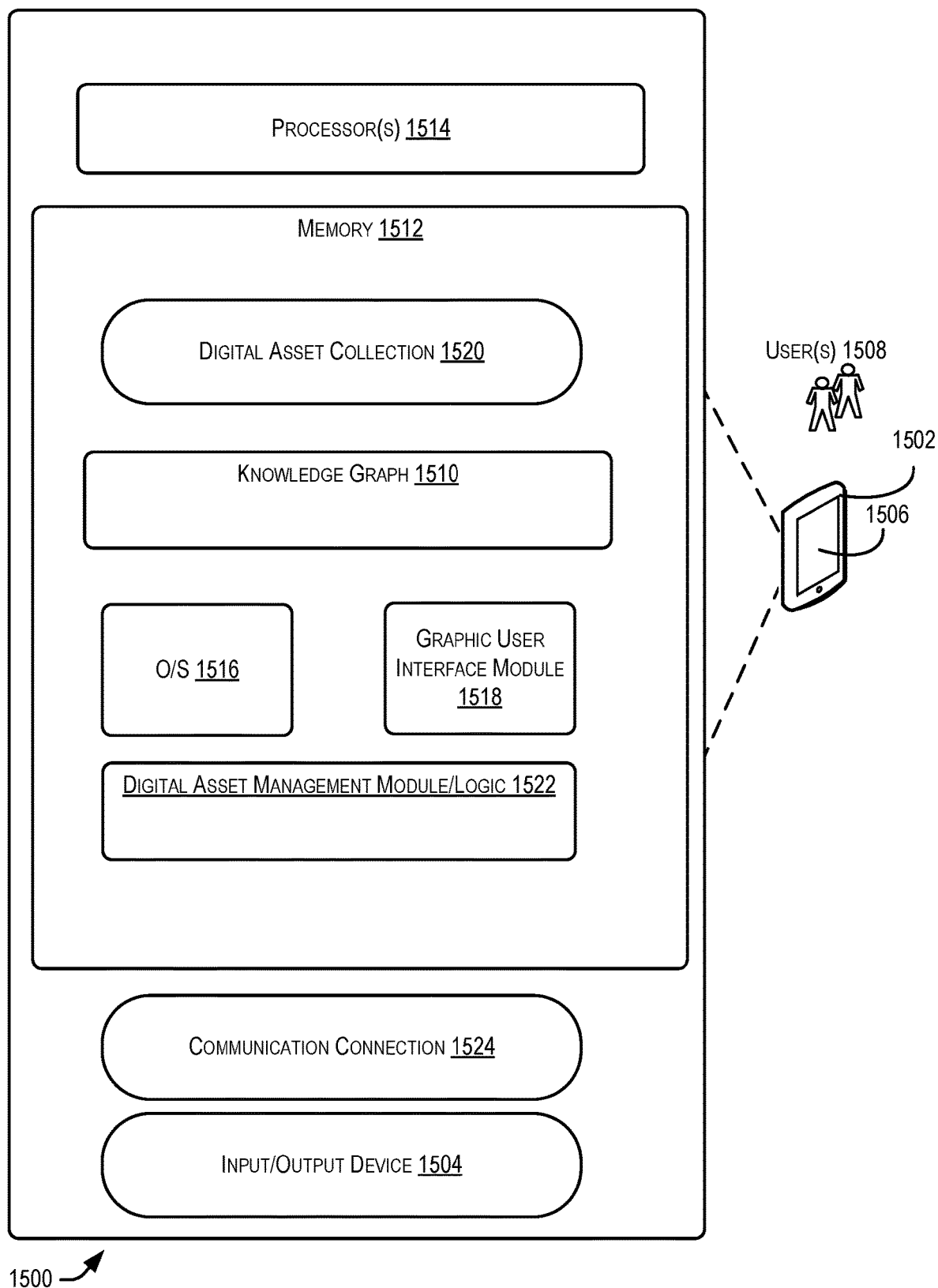
FIG. 15 is a simplified block diagram illustrating is a computer architecture for providing audio and/or video effects techniques as described herein, according to at least one example.

FIG. 15 is a simplified block diagram illustrating example architecture 1500 for implementing the features described herein, according to at least one embodiment. In some examples, computing device 1502, having example architecture 1500, may be configured to present relevant user interfaces, capture audio and video information, search digital asset collections, display relevant results on a display, receive haptic inputs, receive touch screen inputs, and perform logic.

Computing device 1502 may be configured to execute or otherwise manage applications or instructions for performing the described techniques such as, but not limited to, providing a user interface (e.g., user interfaces 100-1100 of FIGS. 1-11) for searching digital assets. Computing device 1502 may receive inputs (e.g., utilizing I/O device(s) 1504 such as at a touch screen 1506 from a user(s) 1508 at the user interface, capture information, process the information, and then present the assets also utilizing I/O device(s) 1504 (e.g., a speaker of computing device 1502). Computing device 1502 may be configured to search data assets stored in a data asset collection 1520.

Computing device 1502 may be any type of computing device such as, but not limited to, a mobile phone (e.g., a smartphone), a tablet computer, a personal digital assistant (PDA), a laptop computer, a desktop computer, a thin-client device, a smart watch, a wireless headset, or the like. The computing device 1502 can be a portable multifunction device having a touch screen 1506 in accordance with some embodiments. The touch screen optionally displays one or more graphics within user interface (UI). In this embodiment, as well as others described below, a user is enabled to select one or more of the graphics by making a gesture on the graphics, for example, with one or more fingers or one or more styluses. In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with computing device 1502. In some implementations or circumstances, inadvertent contact with a graphic does not select the graphic. For example, a swipe gesture that sweeps over an application icon optionally does not select the corresponding application when the gesture corresponding to selection is a tap. Computing device 1502 can optionally also include one or more physical buttons, such as "home" or menu button. As menu button is, optionally, used to navigate to any application in a set of applications that are, optionally executed on the computing device 1502. Alternatively, in some embodiments, the menu button is implemented as a soft key in a GUI displayed on touch screen 1506.

In one embodiment, computing device 1502 includes touch screen 1506, menu button, push button for powering the device on/off and locking the device, volume adjustment button(s), Subscriber Identity Module (SIM) card slot, head set jack, and docking/charging external port. Push button is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1502 also accepts verbal input for activation or deactivation of some functions through microphone. Computing device 1502 also, optionally, includes one or more contact intensity sensors for detecting intensity of contacts on touch screen 1506 and/or one or more tactile output generators for generating tactile outputs for a user of device 1502.

In one illustrative configuration, computing device 1502 may include at least one memory 1512 and one or more processing units (or processor(s)) 1514. Processor(s) 1514 may be implemented as appropriate in hardware, software, or combinations thereof. Computer-executable instruction or firmware implementations of processor(s) 1514 may include computer-executable instructions written in any suitable programming language to perform the various functions described.

Memory 1512 may store program instructions that are loadable and executable on processor(s) 1514, as well as data generated during the execution of these programs. Depending on the configuration and type of computing device 1502, memory 1512 may be volatile (such as random access memory (RAM)) and/or non-volatile (such as read-only memory (ROM), flash memory, etc.). Computing device 1502 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, memory 1512 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

Memory 1512 and additional storage, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. Memory 1512 and additional storage are both examples of non-transitory computer storage media. Additional types of computer storage media that may be present in computing device 1502 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by computing device 1502. Combinations of any of the above should also be included within the scope of non-transitory computer-readable storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

Computing device 1502 may also contain communications connection(s) 1524 that allow computing device 1502 to communicate with a data store, another computing device or server, user terminals and/or other devices via one or more networks. Such networks may include any one or a combination of many different types of networks, such as cable networks, the Internet, wireless networks, cellular networks, satellite networks, other private and/or public networks, or any combination thereof. Computing device 1502 may also include I/O device(s) 1504, such as a touch input device, a keyboard, a mouse, a pen, a voice input device, a display, a speaker, a printer, etc.

Turning to the contents of memory 1512 in more detail, memory 1512 may include operating system 1516 and/or one or more application programs or services for implementing the features disclosed herein including the graphic user interface module 1518, the digital asset collection 1520 and the knowledge graph 1510. Memory 1512 may also be configured to store one or more audio and video files as digital assets in the digital asset collection 1520 and the knowledge graph 1510 In this way, computing device 1502 can perform all of the operations described herein.

In some examples, user interface module 1518 may be configured to manage the user interface of computing device 1502. For example, user interface module 1518 may present any number of various UIs requested by computing device 1502. In particular, user interface module 1518 may be configured to present UIs 100-1100 of FIGS. 1-11, which enables implementation of the features describe herein, specifically searching the digital asset collection and providing a user 1508 an easy way to search the digital assets.

The computing device 1502 also includes a graphical user interface (GUI) Module 1518. The GUI module 1518 is utilized to output signals for a display device associated with the client computing device 1502. The client computing device 1502 also includes a display interface to interface with the display device. The client computing device 1502 can request data for the video information window from a media server (e.g., media server) via the network interface. In one embodiment, the media server provides the requested data in an XML format. The client computing device 1502 can process the requested data and cause the GUI module 1518 to present the video information window. In some embodiments, object updater creates and updates objects used in the graphical user interface. For example, object updater creates a new user-interface object or updates the position of a user-interface object. GUI updater updates the GUI. For example, GUI updater prepares display information and sends it to graphics module for display on a display such as touch-sensitive display.

In some embodiments, a digital asset management module/logic obtains or generates a knowledge graph 1510 metadata network (hereinafter "knowledge graph") associated with a collection of digital assets. The metadata network can comprise of correlated metadata assets describing characteristics associated with digital assets in the digital asset collection. Each metadata asset can describe a characteristic associated with one or more digital assets in the digital asset collection. In a non-limiting example, a metadata asset can describe a characteristic associated with multiple digital assets in the digital asset collection. Each metadata asset can be represented as a node in the metadata network. A metadata asset can be correlated with at least one other metadata asset. Each correlation between metadata assets can be represented as an edge in the metadata network that is between the nodes representing the correlated metadata assets. In some embodiments, the digital asset management module/logic identifies a first metadata asset in the metadata network. The digital asset management module/logic can also identify a second metadata asset based on at least the first metadata asset. In some embodiments, the digital asset management module/logic causes one or more digital assets with the first and/or second metadata assets to be presented via an output device.

In some embodiments, the digital asset management module/logic 1522 can enable the system to generate and use and knowledge graph 1510 of the digital asset metadata as a multidimensional network. The digital asset management module/logic 1522 can obtain or receive a collection of digital asset metadata associated with the digital asset collection. The digital assets stored in the digital asset collection includes, but is not limited to, the following: image media (e.g., still or animated image, etc.); audio media (e.g., a digital sound file); text media (e.g., an e-book, etc.); video media (e.g., a movie, etc.); and haptic media (e.g., vibrations or motions provided in connection with other media, etc.). The examples of digitized data above can be combined to form multimedia (e.g., an animated movie, a videogame etc.). A single digital asset refers to a single instance of digitized data (e.g., an image, a song, a movie, etc.).

As used herein, "metadata" and "digital asset metadata" collectively referred to information about one or more digital assets. Metadata can be: (i) a single instance of information about digitized data (e.g., a timestamp associated with one or more images, etc.); or (ii) a grouping of metadata, which refers to a group comprised of multiple instances of information about digitized data (e.g., several timestamps associated with one or more images etc.). There are different types of metadata. Each type of metadata describes one or more characteristics or attributes associated with one or more digital assets. Each metadata type can be categorized as primitive metadata or inferred metadata, as described further below.

In some embodiments, the digital asset management module/logic 1522 can identify primitive metadata associated with one or more digital assets within the digital asset metadata. In some embodiments, the digital asset management module/logic 1522 may determine inferred metadata based on at least on the primitive metadata. As used herein, "primitive metadata" refers to metadata that describes one or more characteristics or attributes associated with one or more digital assets. That is, primitive metadata includes acquired metadata describing one or more digital assets. In some cases, primitive metadata can be extracted from inferred metadata, as described further below.

Primary primitive metadata can include one or more of: time metadata, Geo-position metadata; geolocation metadata; people metadata; scene metadata; content metadata; object metadata; and sound metadata. Time metadata refers to a time associated with one or more digital assets (e.g., a timestamp associated with the digital asset, a time the digital asset is generated, a time the digital asset is modified, a time the digital asset is stored, a time the digital asset is transmitted, a time the digital asset is received, etc.). Geoposition metadata refers to geographic or spatial attributes associated with one or more digital assets using a geographic coordinate system (e.g., latitude, longitude, and/or altitude, etc.). Geolocation metadata refers to one or more meaningful locations associated with one or more digital assets rather than geographic coordinates associated with digital assets. Examples include a beach (and its name), a street address, a country name, a region, a building, a landmark, etc. Geolocation metadata can, for example, be determined by processing geographic position information together with data from a map application to determine that the geolocation for a scene in a group of images. People metadata refers to at least one detected or known person associated with one or more digital assets (e.g., a known person in an image detected through facial recognition techniques, etc.). Scene metadata refers to an overall description of an activity or situation associated with one or more digital assets. For example, if a digital asset includes a group of images, then scene metadata for the group of images can be determined using detected objects in images. For more specific example, the presence of a large cake with candles and balloons in at least two images in the group can be used to determine that the scene for the group of images is a birthday celebration. Object metadata refers to one or more detected objects associated with one or more digital assets (e.g., a detected animal, a detected company logo, a detected piece of furniture, etc.). Content metadata refers to features of digital assets (e.g., pixel characteristics, pixel intensity values, luminescence values, brightness values, loudness levels, etc.). Sound metadata refers to one or more detected sounds associated with one or more digital assets (e.g., detected sound is a human's voice, a detected sound as a fire truck's siren etc.).

Auxiliary primitive metadata includes, but is not limited to, the following: (i) a condition associated with capturing the one or more digital assets; (ii) the condition associated with modifying one or more digital assets; and (iii) a condition associated with storing or retrieving one or more digital assets. As used herein "inferred metadata" refers to additional information about one or more digital assets that is beyond the information provided by primitive metadata. One difference between primitive metadata and inferred metadata is that primitive metadata represents an initial set of descriptions of one or more digital assets while inferred metadata provides additional descriptions of the one or more digital assets based on processing of one or more of the primitive metadata and contextual information. For example, primitive metadata can be used to identify detected persons in a group of images as John Doe and Jane duo, one inferred metadata may identify John Doe and Jane Doe as a married couple based on processing one or more of the primitive metadata (i.e., the initial set of descriptions and contextual information). In some embodiments, inferred metadata is formed from at least one of: (i) a combination of different types of primitive metadata; (ii) a combination of different types of contextual information; (iii) or a combination of primitive metadata and contextual information. As used herein, "contacts" and its variations refer to any or all attributes of a user's device that includes or has access to a digital asset collection associated with the user, such as physical, logical, social, and/or other contact contextual information. As used herein, "contextual information" and its variation refer to metadata assets that describes or defines the user's context or context of a user's device that includes or has access to a digital asset collection associated with the user. Exemplary contextual information includes, but is not limited to, the following: a predetermined time interval; an event scheduled to occur at a predetermined time interval; a geolocation to be visited at a predetermined time interval; one or more identified persons associated with a predetermined time; an event scheduled for predetermined time, or geolocation to be visited a predetermined time; whether metadata describing whether associated with a particular period of time (e.g., rain, snow, windy, cloudy, sunny, hot, cold, etc.); Season related metadata describing a season associated with capture of the image. For some embodiments, the contextual information can be obtained from external sources, a social networking application, a weather application, a calendar application, and address book application, any other type of application, or from any type of data store accessible via wired or wireless network (e.g., the Internet, a private intranet, etc.).

Primary inferred metadata can include event metadata describing one or more events associated with one or more digital assets. For example, if a digital asset includes one or more images, the primary inferred metadata can include event metadata describing one or more events where the one or more images were captured (e.g., vacation, a birthday, a sporting event, a concert, a graduation ceremony, a dinner, project, a workout session, a traditional holiday etc.). Primary inferred metadata can in some embodiments, be determined by clustering one or more primary primitive metadata, auxiliary primitive metadata, and contextual metadata. Auxiliary inferred metadata includes but is not limited to the following: (i) geolocation relationship metadata; (ii) person relationship metadata; (iii) object relationship metadata; space and (iv) sound relationship metadata. Geolocation relationship metadata refers to a relationship between one or more known persons associated with one or more digital assets and on one or more meaningful locations associated with the one or more digital assets. For example, an analytics engine or data meeting technique can be used to determine that a scene associated with one or more images of John Doe represents John Doe's home. Personal relationship metadata refers to a relationship between one or more known persons associated with one or more digital assets and one or more other known persons associated with one or more digital assets. For example, an analytics engine or data mining technique can be used to determine that Jane Doe (who appears in more than one image with John Doe) is John Doe's wife. Object relationship metadata refers to relationship between one or more known objects associated with one or more digital assets and one or more known persons associated with one or more digital assets. For example, an analytics engine or data mining technique can be used to determine that a boat appearing in one or more images with John Doe is owned by John Doe. Sound relationship metadata refers to a relationship between one or more known sounds associated with one or more digital asset and one or more known persons associated with the one or more digital assets. For example, an analytics engine or data mining technique can be used to determine that a voice that appears in one or more videos with John Doe is John Doe's voice.

As explained above, inferred metadata may be determined or inferred from primitive metadata and/or contextual information by performing at least one of the following: (i) data mining the primitive metadata and/or contextual information; (ii) analyzing the primitive metadata and/or contextual information; (iii) applying logical rules to the primitive metadata and/or contextual information; or (iv) any other known methods used to infer new information from provided or acquired information. Also, primitive metadata can be extracted from inferred metadata. For a specific embodiment, primary primitive metadata (e.g., time metadata, geolocation metadata, scene metadata, etc.) can be extracted from primary inferred metadata (e.g., event metadata, etc.). Techniques for determining inferred metadata and/or extracting primitive metadata from inferred metadata can be iterative. For a first example, inferring metadata can trigger the inference of other metadata and so on primitive metadata from inferred metadata can trigger inference of additional inferred metadata or extraction of additional primitive metadata.

The primitive metadata and the inferred metadata described above are collectively referred to as the digital asset metadata. In some embodiments, the digital asset maintenance module/logic uses the digital asset metadata to generate a knowledge graph 1510. All or some of the metadata network can be stored in the processing unit(s) and/or the memory. As used herein, a "knowledge graph," a "knowledge graph metadata network," a "metadata network," and their variations refer to a dynamically organized collection of metadata describing one or more digital assets (e.g., one or more groups of digital assets in a digital asset collection, one or more digital assets in a digital asset collection, etc.) used by one or more computer systems for deductive reasoning. In a metadata network, there is no digital assets—only metadata (e.g., metadata associated with one or more groups of digital assets, metadata associated with one or more digital assets, etc.). Metadata networks differ from databases because, in general, a metadata network enables deep connections between metadata using multiple dimensions, which can be traversed for additionally deduced correlations. This deductive reasoning generally is not feasible in a conventional relational database without loading a significant number of database tables (e.g., hundreds, thousands, etc.). As such, conventional databases may require a large amount of computational resources (e.g., external data stores, remote servers, and their associated communication technologies, etc.) to perform deductive reasoning. In contrast, a metadata network may be viewed, operated, and/or stored using fewer computational resource requirements than the preceding example of databases. Furthermore, metadata networks are dynamic resources that have the capacity to learn, grow, and adapt as new information is added to them. This is unlike databases, which are useful for accessing cross-referred information. While a database can be expanded with additional information, the database remains an instrument for accessing the cross-referred information that was put into it. Metadata networks do more than access cross-referred information—they go beyond that and involve the extrapolation of data for inferring or determining additional data.

As explained in the preceding paragraph, a metadata network enables deep connections between metadata using multiple dimensions in the metadata network, which can be traversed for additionally deduced correlations. Each dimension in the metadata network may be viewed as a grouping of metadata based on metadata type. For example, a grouping of metadata could be all time metadata assets in a metadata collection and another grouping could be all geo-position metadata assets in the same metadata collection. Thus, for this example, a time dimension refers to all time metadata assets in the metadata collection and a geo-position dimension refers to all geo-position metadata assets in the same metadata collection. Furthermore, the number of dimensions can vary based on constraints. Constraints include, but are not limited to, a desired use for the metadata network, a desired level of detail, and/or the available metadata or computational resources used to implement the metadata network. For example, the metadata network can include only a time dimension, the metadata network can include all types of primitive metadata dimensions, etc. With regard to the desired level of detail, each dimension can be further refined based on specificity of the metadata. That is, each dimension in the metadata network is a grouping of metadata based on metadata type and the granularity of information described by the metadata. For a first example, there can be two time dimensions in the metadata network, where a first time dimension includes all time metadata assets classified by week and the second time dimension includes all time metadata assets classified by month. For a second example, there can be two geolocation dimensions in the metadata network, where a first geolocation dimension includes all geolocation metadata assets classified by type of establishment (e.g., home, business, etc.) and the second geolocation dimension includes all geolocation metadata assets classified by country. The preceding examples are merely illustrative and not restrictive. It is to be appreciated that the level of detail for dimensions can vary depending on designer choice, application, available metadata, and/or available computational resources.

The digital asset management module/logic 1522 can be configured to generate the metadata network as a multidimensional network of the digital asset metadata. As used herein, "multidimensional network" and its variations refer to a complex graph having multiple kinds of relationships. A multidimensional network generally includes multiple nodes and edges. For one embodiment, the nodes represent metadata, and the edges represent relationships or correlations between the metadata. Exemplary multidimensional networks include, but are not limited to, edge labeled multi-graphs, multipartite edge labeled multi-graphs and multilayer networks.

For one embodiment, the nodes in the metadata network represent metadata assets found in the digital asset metadata. For example, each node represents a metadata asset associated with one or more digital assets in a digital asset collection. For another example, each node represents a metadata asset associated with a group of digital assets in a digital asset collection. As used herein, "metadata asset" and its variation refer to metadata (e.g., a single instance of metadata, a group of multiple instances of metadata, etc.) Describing one or more characteristics of one or more digital assets in a digital asset collection. As such, there can be primitive metadata asset, inferred metadata asset, a primary primitive metadata asset, and exhilarate primitive metadata asset, a primary inferred metadata asset, and/or and exhilarate inferred metadata asset. For a first example, a primitive metadata asset refers to a time metadata asset describing a time interval between Jun. 1, 2016 and Jun. 3, 2016 when one or more digital assets were captured. For a second example, a primitive metadata asset refers to a geo-position metadata asset describing one or more latitudes and/or longitudes where one or more digital assets were captured. For another example, an inferred metadata asset refers to an event metadata asset describing a vacation in Paris, France between Jun. 5, 2016 and Jun. 30, 2016 when one or more digital assets were captured.

In some embodiments, the metadata network includes two types of nodes: (i) Moment nodes; and (ii) non-Moment nodes. As used herein, a "Moment" refers to a single event (as described by an event metadata asset) that is associated with one or more digital assets. For example, a Moment refers to a vacation in Paris, France that lasted between Jun.

1, 2016 and Jun. 9, 2016. For example, the Moment can be used to identify one or more digital assets (e.g., one image, a group of images, a video, a group of videos, a song, a group of songs, etc.) Associated with the vacation in Paris, France that lasted between Jun. 1, 2016 and Jun. 9, 2016 (and not with any other event). As used herein, a "Moment node" refers to a node in a multidimensional network that represents a Moment. Thus, a Moment node referred to a primary inferred metadata asset representing a single event associated with one or more digital assets. Primary inferred metadata as described above. As used herein, a "non-Moment node" refers to a node in a multidimensional network that does not represent a Moment. Thus a non-Moment node refers to at least one of the following: (i) a primitive metadata asset associate with one or more digital assets; or (ii) and inferred metadata asset associated with one or more digital assets that is not a Moment (i.e., not an event metadata asset).

As used herein, an "event" in its variations refer to a situation or an activity occurring at one or more locations during a specific time interval. An event includes, but is not limited to the following: a gathering of one or more persons to perform an activity (e.g., a holiday, a vacation, a birthday, a dinner, a project, a workout session, etc.); a sporting event (e.g., an athletic competition etc.); a ceremony (e.g., a ritual of cultural significance that is performed on a special occasion, etc.); a meeting (e.g., a gathering of individuals engaged in some common interest, etc.); a festival (e.g., a gathering to celebrate some aspect in a community, etc.); a concert (e.g., an artistic performance, etc.); a media event (e.g., an event created for publicity, etc.); and a party (e.g., a large social or recreational gathering, etc.).

The knowledge graph 1510 can be generated and used by the processing system to perform digital asset management in accordance with an embodiment. Generating the metadata network, by the digital asset management module/logic, can include defining nodes based on the primitive metadata and/or the inferred metadata associated with one or more digital assets in the digital asset collection. As a digital asset management module/logic 1522 identifies more primitive metadata with the metadata associated with a digital asset collection and/or infers metadata from at least the primitive metadata, the digital asset management module/logic 1522 can generate additional nodes to represent the primitive metadata and/or the inferred metadata. Furthermore, as the digital asset management module/logic 1522 determines correlations between the nodes, the digital asset management module/logic 1522 can create edges between the nodes. Two generation processes can be used to generate the metadata network. The first generation process is initiated using a metadata asset that does not describe a Moment (e.g., primary primitive metadata asset, and auxiliary primitive metadata asset, and auxiliary inferred metadata asset, etc.). The second generation process is initiated using a metadata asset that describes a Moment (e.g., event metadata). Each of these generation processes are described below.

For the first generation process, the digital asset management module/logic 1522 can generate a non-Moment node to represent metadata associated with the user, a consumer, or an owner of a digital asset collection associated with the metadata network. For example a user can be identified as Jean DuPont. One embodiment, the digital asset management module/logic 1522 generates the non-Moment node to represent the metadata provided by the user (e.g., Jean DuPont, etc.) via an input device. For example, the user can add at least some of the metadata about himself or herself to the metadata network via an input device. In this way, the digital asset management module/logic 1522 can use the metadata to correlate the user with other metadata acquired from a digital asset collection for example, the metadata provided by the user Jean DuPont can include one or more of his name's birthplace (which is Paris, France), his birthdate (which is May 27, 1991), his gender (which is male), his relations status (which is married), his significant other or spouse (which is Marie Dupont), and his current residence (which is in Key West, Fla., USA).

With regard to the first generation process, at least some of the metadata can be predicted based on processing performed by the digital asset management module/logic. The digital asset management module/logic 1522 may predict metadata based on analysis of metadata access the application or metadata and a data store (e.g., memory). For example, the digital asset management module/logic 1522 may predict the metadata based on analyzing information acquired by accessing the user's contacts (via a contacts application), activities (the account or application or an organization application should), contextual information (via sensors or peripherals) and/or social networking data (via social networking application).

In some embodiments, the metadata includes, but is not limited to, other metadata such as a user's relationship with others (e.g., family members, friends, coworkers, etc.), the user's workplaces (e.g., past workplaces, present workplaces, etc.), Places visited by the user (e.g., previous places visited by the user, places that will be visited by the user, etc.). For one embodiment, the metadata 210 can be used alone or in conjunction with other data to determine or infer at least one of the following: (i) vacations or trips taken by Jean Dupont; days of the week (e.g., weekends, holidays, etc.); locations associated with Jean Dupont; Jean Dupont's social group (e.g., his wife Marie Dupont); Jean Dupont's professional or other groups (e.g., groups based on his occupation, etc.); types of places visited by Jean Dupont (e.g., Prime 114 restaurant, Home); activities performed (e.g., a work-out session, etc.); etc. The preceding examples are illustrative and not restrictive.

For the second generation process, the metadata network may include at least one Moment node. For this second generation process, the digital asset management module/logic 1522 generates the Moment node to represent one or more primary inferred metadata assets (e.g., an event metadata asset, etc.). The digital asset management module/logic 1522 can determine or infer the primary inferred metadata (e.g., an event metadata asset, etc.) From one or more information, the metadata, or other data received from external sources (e.g., whether application, calendar application, social networking application, address books, etc. Also, the digital asset management module/logic 1522 may receive the primary inferred metadata assets, generate this metadata as the Moment node and extract primary primitive metadata from the primary inferred metadata assets represented as the Moment node.

The knowledge graph 1510 can be obtained from memory. Additionally, or alternatively, the metadata network can be generated by processing units. The knowledge graph 1510 is created when a first metadata asset (e.g., a Moment node, non-Moment node, etc.) is identified in the multidimensional network representing the metadata network. For one embodiment, the first metadata can be represented as a Moment node. For this embodiment the first metadata asset represents a first event associated with one or more digital assets. A second metadata asset is identified or detected based at least on the first metadata asset. The second metadata asset may be identified or detected in the metadata network is a second node (e.g., a Moment node in Moment node, etc.) based on the first nose used to represent the first metadata asset in some embodiments, the second metadata asset is represented as a second Moment node that differs from the first Moment node. This is because the first Moment node represents a first event metadata asset that describes a first a second event associated with one or more digital assets where the second Moment node represents a second event metadata asset that describes the second event associated with one or more digital assets.

In some embodiments, identifying the second metadata asset (e.g., a Moment node, etc.) is performed by determining that the first and second metadata assets share a primary primitive metadata asset, a primary inferred metadata asset, an auxiliary primitive metadata asset, and/or an auxiliary inferred metadata asset even though some of their metadata differ. Further explanation for using or generating a knowledge graph 1510 can be found in U.S. patent application Ser. No. 15/391,276, filed Dec. 27, 2016, entitled "Knowledge Graph Metadata Network Based on Notable Moments," which is incorporated by reference in its entirety and for all purposes.

Illustrative methods, computer-readable medium, and systems for providing various techniques for adjusting audio and/or video content based at least in part on voice and/or facial feature characteristics are described above. Some or all of these systems, media, and methods may, but need not, be implemented at least partially by architectures and flows such as those shown at least in FIGS. 1-11 above. While many of the embodiments are described above with reference to messaging applications, it should be understood that any of the above techniques can be used within any type of application including real-time video playback or real-time video messaging applications. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system 1516, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system 1516 and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art (except for transitory media like carrier waves or the like) such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, as noted above, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

As described above, one aspect of the present technology is the gathering and use of data available from various sources to search for digital assets. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to search for and display digital assets and information concerning digital assets. Accordingly, use of such personal information data can be presented to a user on the display. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of digital asset search techniques, the present technology can be configured to allow users to select to "opt in" or "opt out" of participation in the collection of personal information data during registration for services or anytime thereafter. In another example, users can select not to provide personal information to be displayed on a display. In yet another example, users can select to limit amount of personal data is maintained or entirely prohibit the display of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the bounding path techniques, or publicly available information.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims), are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise be read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Additionally, conjunctive language such as the phrase "at least one of X, Y, and Z," unless specifically stated otherwise, should also be understood to mean X, Y, Z, or any combination thereof, including "X, Y, and/or Z."

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computing device, comprising:
   one or more memories;
   one or more processors in communication with the one or more memories; and
   a display with a graphical user interface configured for:
   displaying a search field in a first area of the display of a digital asset collection page of the computing device, the search field for receiving text associated with a digital asset collection of the computing device;
   displaying at least one representative multimedia icon including a first keyword tag, derived by the computing device from a knowledge graph of the digital asset collection, for at least one search category in a second area of the display, wherein the representative multimedia icon represents at least one asset within the digital asset collection associated with the first keyword tag;
   receiving a selection of the at least one representative multimedia icon of a desired search category corresponding to the first keyword tag;
      initiating a search of the digital asset collection of the computing device for relevant digital assets of the desired search category;
   displaying a subset of the digital asset collection depending on the desired search category on the display;
   deriving, by the computing device, at least one suggested search term based, at least in part, on the knowledge graph of the digital asset collection and a determined correlation between a first set of metadata of the desired search category and a second set of metadata of the digital assets;
   calculating a priority score for each of the at least one suggested search terms;
   displaying, on the graphical user interface, a second keyword tag associated with each of the at least one suggested search terms, wherein each of the second keyword tags are displayed based on a ranking of the priority scores for each of the second keyword tags' associated suggested search terms;
   further filtering the digital assets of the digital asset collection, in response to receiving a selection of at least one of the second keyword tags, to exclude certain digital assets that are not related to the at least one selected second keyword tag, the further filtering creating a further revised digital asset collection; and
   displaying the further revised asset collection on the display.

2. The computing device of claim 1, wherein:
   the at least one suggested search term is suggested automatically by the one or more processors.

3. The computing device of claim 1, wherein the at least one suggested search term comprises identifying text and a collection icon, wherein the collection icon identifies a collection of the at least one suggested search term in the digital asset collection.

4. The computing device of claim 1, further comprising:
   displaying on the graphical user interface, at least one second suggested search term based at least in part on a correlation between one or more textual entries in the search field and a set of metadata of the digital assets;
   displaying a third keyword tag associated with the at least one second suggested search term;
   further filtering the digital assets of the digital asset collection, in response to receiving a selection of the third keyword tag, to exclude certain digital assets that are not related to the third keyword tag, the further filtering creating a second further revised digital asset collection; and
displaying the second further revised asset collection on the display.

5. The computing device of claim 1, further comprising:
autocompleting a textual entry of a portion of a search term entered into a search field depicted in an area of the user interface, wherein the autocompleting is based at least in part on metadata stored in the knowledge graph and a weighted criteria that considers at least one of:
 a quantity of the digital assets for the keyword tag that matches a completed search term;
 a position of a matched term in the keyword tag for multi-term keyword tags, wherein the matched term matches the completed search term;
 an asset category of the keyword tag that corresponds to the completed search term;
 a position of the keyword tag for the completed search term, wherein the position is in a ranking of the keyword tags in a selected asset category; or
 a quantity of matched keyword tags for the completed search term; and
displaying, on the user interface, the completed search term in the search field.

6. The computing device of claim 1, further comprising the graphical user interface displaying one or more multimedia icons in a plurality of collections as determined at least in part by the keyword tag associated with the multimedia icon, wherein each collection is displayed in an individual area of the display.

7. The computing device of claim 6, wherein the collections comprise events, people, places, categories, and groups.

8. The computing device of claim 6, further comprising the graphical user interface scrolling a list of multimedia icons in at least one collection of multimedia icons at least in response to identification of a hand gesture.

9. The computing device of claim 1, wherein the multimedia icon comprises a depiction of a representative asset in the digital asset collection corresponding to the first keyword tag.

10. A method for displaying a graphical user interface on a computing device with a display, comprising:
 displaying a search field in a first area of the display of a digital asset collection page of the computing device, the search field for receiving text associated with a digital asset collection of the computing device;
 displaying at least one user interface element including a first keyword tag, generated by the computing device from a knowledge graph of the digital asset collection, for at least one search category in a second area of the display, wherein the user interface element represents at least one asset within the digital asset collection associated with the first keyword tag;
 receiving a selection of the at least one user interface element of a desired search category corresponding to the first keyword tag;
 initiating a search of the digital asset collection of the computing device for relevant content of the desired search category;
 displaying a subset of the digital asset collection depending on the desired search category on the display;
 deriving, by the computing device, at least one suggested search term based, at least in part, on the knowledge graph of the digital asset collection and a determined correlation between a first set of metadata of the desired search category and a second set of metadata of the digital assets;
 calculating a priority score for each of the at least one suggested search terms;
 displaying, on the graphical user interface, a second keyword tag associated with each of the at least one suggested search terms, wherein each of the second keyword tags are displayed based on a ranking of the priority scores for each of the second keyword tags' associated suggested search terms;
 further filtering the digital assets of the digital asset collection, in response to receiving a selection of at least one of the second keyword tags, to exclude certain digital assets that are not related to the at least one selected second keyword tag, the further filtering creating a further revised digital asset collection; and
 displaying the further revised asset collection on the display.

11. The method of claim 10, wherein:
the at least one suggested search term is suggested automatically by the computing device.

12. The method of claim 10, wherein the suggested search term comprises identifying text and a collection icon, wherein the collection icon identifies a collection of the suggested search term in the digital asset collection.

13. The method of claim 10, further comprising:
 displaying on the graphical user interface a second suggested search term based at least in part on a correlation between one or more textual entries in the search field and a set of metadata of the digital assets;
 displaying a third keyword tag associated with the second suggested search term;
 further filtering the digital assets of the digital asset collection, in response to receiving a selection of the third keyword tag, to exclude certain digital assets that are not related to the third keyword tag, the further filtering creating a second further revised digital asset collection; and
 displaying the second further revised asset collection on the display.

14. The method of claim 10, further comprising:
autocompleting a textual entry of a portion of a search term entered into a search field depicted in an area of the user interface, wherein the autocompleting is based at least in part on metadata stored in the knowledge graph and a weighted criteria that considers at least one of:
 a quantity of the digital assets for the keyword tag that matches a completed search term;
 a position of a matched term in the keyword tag for multi-term keyword tags, wherein the matched term matches the completed search term;
 an asset category of the keyword tag that corresponds to the completed search term;
 a position of the keyword tag for the completed search term, wherein the position is in a ranking of the keyword tags in a selected asset category; or
 a quantity of matched keyword tags for the completed search term; and
displaying, on the user interface, the completed search term in the search field.

15. The method of claim 10, further comprising the graphical user interface displaying one or more multimedia icons in a plurality of collections as determined at least in part by the keyword tag associated with the user interface element, wherein each collection is displayed in an individual area of the display.

16. A non-transitory computer readable medium storing a plurality of instructions that, when executed by one or more processors of a computing device with a display, configure the one or more processors to perform operations comprising:

generating a graphical user interface for searching a digital asset collection on the computing device;

providing a search field in a first area of the graphical user interface, the search field for receiving text associated with the digital asset collection of the computing device;

providing at least one user interface element including a first keyword tag for at least one search category in a second area of the display, wherein the at least one user interface element is generated by the computing device from a knowledge graph of the digital asset collection, and a search of the digital asset collection of the computing device for relevant content of a desired search category is initiated by activating a desired user interface element;

deriving, by the computing device, at least one suggested search term based, at least in part, on the knowledge graph of the digital asset collection and a determined correlation between a first set of metadata of the desired search category and a second set of metadata of the digital assets;

calculating a priority score for each of the at least one suggested search terms;

displaying, on the graphical user interface, a second keyword tag associated with each of the at least one suggested search terms, wherein each of the second keyword tags are displayed based on a ranking of the priority scores for each of the second keyword tags' associated suggested search terms;

further filtering the digital assets of the digital asset collection, in response to receiving a selection of at least one of the second keyword tags, to exclude certain digital assets that are not related to the at least one selected second keyword tag, the further filtering creating a further revised digital asset collection; and displaying the further revised asset collection on the display.

17. The non-transitory computer readable medium of claim 16, wherein:

the suggested search term is suggested automatically by the one or more processors.

18. The non-transitory computer readable medium of claim 17, wherein the suggested search term comprises identifying text and a collection icon, wherein the collection icon identifies a collection of the suggested search term in the digital asset collection.

19. The non-transitory computer readable medium of claim 16, further comprising instructions that, when executed by the one or more processors, configure the one or more processors to perform operations further comprising:

displaying on the graphical user interface a second suggested search term based at least in part on a correlation between one or more textual entries in the search field and a set of metadata of the digital assets;

displaying a third keyword tag associated with the second suggested search term;

further filtering the digital assets of the digital asset collection, in response to receiving a selection of the second suggested search term, to exclude certain digital assets that are not related to the second suggested search term, the further filtering creating a second further revised digital asset collection; and displaying the second further revised asset collection on the display.

20. The non-transitory computer readable medium of claim 16, further comprising instructions that, when executed by the one or more processors, configure the one or more processors to perform operations further comprising:

autocompleting a textual entry of a portion of a search term entered into a search field depicted in an area of the user interface, wherein the autocompleting is based at least in part on metadata stored in the knowledge graph and a weighted criteria that considers at least one of:

a quantity of the digital assets for the keyword tag that matches a completed search term;

a position of a matched term in the keyword tag for multi-term keyword tags, wherein the matched term matches the completed search term;

an asset category of the keyword tag that corresponds to the completed search term;

a position of the keyword tag for the completed search term, wherein the position is in a ranking of the keyword tags in a selected asset category; or a quantity of matched keyword tags for the completed search term; and displaying, on the user interface, the completed search term in the search field.

* * * * *